United States Patent
Keeton et al.

(10) Patent No.: US 10,489,310 B2
(45) Date of Patent: Nov. 26, 2019

(54) DETERMINING CACHE VALUE CURRENCY USING PERSISTENT MARKERS

(71) Applicant: HEWLETT PACKARD ENTERPRISE DEVELOPMENT LP, Houston, TX (US)

(72) Inventors: Kimberly Keeton, San Francisco, CA (US); Yupu Zhang, Palo Alto, CA (US); Haris Volos, Palo Alto, CA (US); Ram Swaminathan, Cupertino, CA (US); Evan R. Kirshenbaum, Mountain View, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 39 days.

(21) Appl. No.: 15/789,431

(22) Filed: Oct. 20, 2017

(65) Prior Publication Data
US 2019/0121750 A1    Apr. 25, 2019

(51) Int. Cl.
*G06F 12/14*     (2006.01)
*G06F 12/128*    (2016.01)

(52) U.S. Cl.
CPC ........ *G06F 12/1466* (2013.01); *G06F 12/128* (2013.01); *G06F 2212/1052* (2013.01); *G06F 2212/621* (2013.01)

(58) Field of Classification Search
CPC .............. G06F 12/128; G06F 12/1466; G06F 2212/1052; G06F 2212/621
USPC ........................................................ 711/145
See application file for complete search history.

(56) References Cited

U.S. PATENT DOCUMENTS

| | | | | |
|---|---|---|---|---|
| 6,633,862 | B2 * | 10/2003 | Thompson | G06F 16/2308 707/610 |
| 7,822,727 | B1 * | 10/2010 | Shaughnessy | G06F 16/2365 707/703 |
| 8,874,515 | B2 * | 10/2014 | Bodwin | G06F 16/1873 707/638 |

(Continued)

OTHER PUBLICATIONS

Hoichi Cheong and Alex Veidenbaum. 1989. A version control approach to Cache coherence. In Proceedings of the 3rd international conference on Supercomputing (ICS '89). ACM, New York, NY, USA, 322-330. DOI: https://doi.org/10.1145/318789.318824 (Year: 1989).*

(Continued)

*Primary Examiner* — Reginald G Bragdon
*Assistant Examiner* — Aaron D Ho
(74) *Attorney, Agent, or Firm* — Fabian VanCott

(57) ABSTRACT

Determining cache value currency using persistent markers is disclosed herein. In one example, a cache entry is retrieved from a local cache memory device. The cache entry includes a key, a value to be used by the computing device, and a marker flag to determine whether the cache entry is current. The local cache memory device also includes a marker location that indicates a location of a marker in a shared persistent fabric-attached memory (FAM). Using a marker location, the marker is retrieved from the shared persistent FAM. From the marker and the marker flag, it is determined whether the cache entry is current. The shared FAM pool is connected to the local cache memory devices of multiple computing devices.

7 Claims, 12 Drawing Sheets

(56) References Cited

U.S. PATENT DOCUMENTS

2015/0169497 A1* 6/2015 Fried .................. G06F 12/0822
                                                          709/214
2017/0192884 A1* 7/2017 Ataras ................ G06F 16/9574

OTHER PUBLICATIONS

S. L. Min and J.-. Baer, "Design and analysis of a scalable cache coherence scheme based on clocks and timestamps," in IEEE Transactions on Parallel and Distributed Systems, vol. 3, No. 1, pp. 25-44, Jan. 1992.doi: 10.1109/71.113080 (Year: 1992).*
Igor Tartalja and Veljko Milutinovic. 1997. Classifying Software-Based Cache Coherence Solutions. IEEE Softw. 14, 3 (May 1997), 90-101. DOI=http://dx.doi.org/10.1109/52.589244 (Year: 1997).*

* cited by examiner

US 10,489,310 B2

DETERMINING CACHE VALUE CURRENCY USING PERSISTENT MARKERS

BACKGROUND

Memory-driven computing provides a memory architecture where a large pool of non-volatile, persistent memory is accessible by a large number of computing devices. This architecture provides an efficient memory environment because of the size of the fabric-attached persistent memory pool, which blends memory and storage, allowing data to be persistently stored in media that permit memory-speed accesses rather than slow storage accesses. The fact that it is byte addressable allows access to data in its in-memory representation without requiring format conversions between the in-memory and on-storage representations.

Fabric-attached memory (FAM) refers to memory that is accessible to compute elements (e.g., processors) across a memory-semantic fabric. Compute elements may load data from FAM using processor load instructions, store data to FAM using processor store instructions, and perform atomic operations supported by the fabric. Fabrics are scalable in that they can be direct connections between a compute element and the FAM, or more generic (and larger-scale) topologies using fabric switches. These generic topologies allow the shared FAM to scale to much larger than would be possible in other scale up shared memory architectures. Unlike scale out architectures, where system scaling is done by adding units of processors and memory and storage, fabrics permit a disaggregated architecture, where compute elements and memory can be independently scaled, to best match the characteristics of the workload, without wasted resources (e.g., if a workload required lots of memory but didn't need additional processing capabilities).

While such fabric-attached persistent memory undoubtedly provides efficient memory accesses, some characteristics reduce its more complete implementation. For example, fabric-attached persistent memory may result in slower accesses as compared to local private memory such as node-local memory, e.g., caches.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
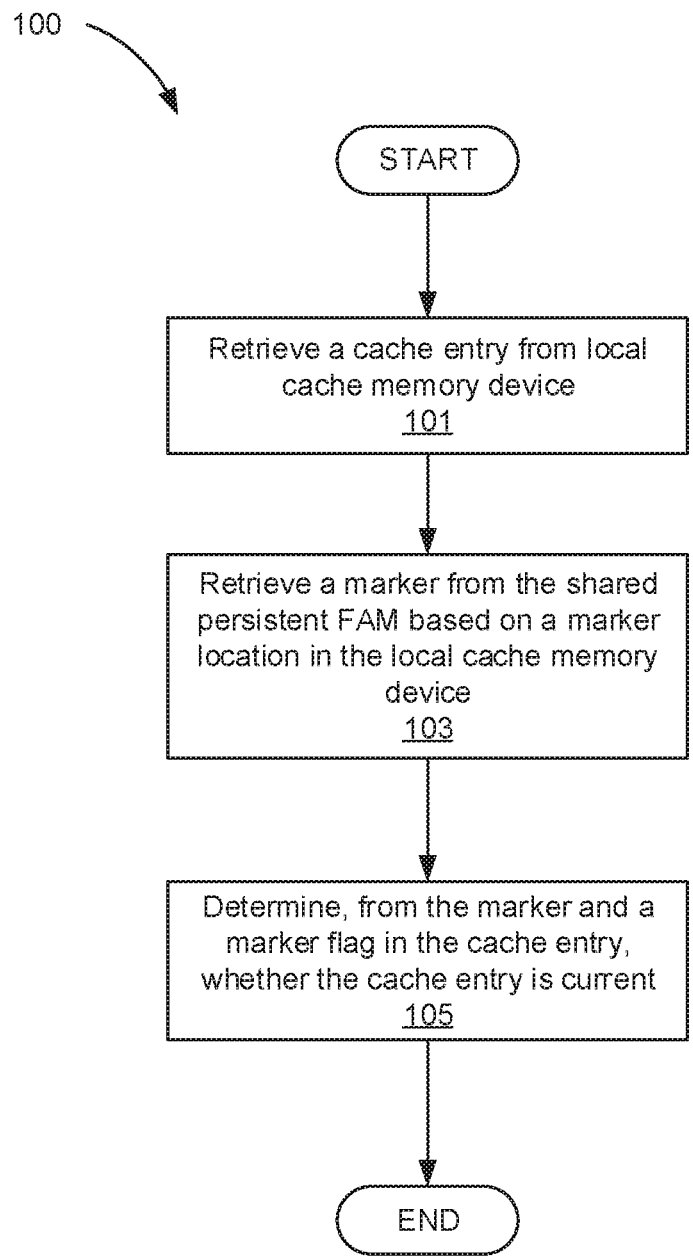
FIG. 1 is a flowchart of a method for determining cache currency using persistent markers, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Examples provided herein allow computing devices in a memory-driven computing architecture to use fast local memory to cache shared data, while allowing quick and efficient determination of the currency of the information stored in that computing device cache. Such a system and method unlock the capability of a fabric-attached non-volatile persistent memory pool beyond static, or dynamic, partitioning. More specifically, the systems and methods of the present application allow performance-conscious applications running on computing devices to leverage node-local memory, such as dynamic random-access memory (DRAM) to cache up-to-date values from the shared fabric-attached memory pool. Performance conscious applications can also take advantage of computing device specific memory, such as dynamic random access memory (DRAM), which has faster access times as compared to the shared persistent fabric-attached memory. That is, local memory is faster to access than fabric-attached memory and DRAM is faster than many of today's non-volatile memory technologies. Accordingly, performance-conscious applications may benefit by leveraging such high-speed local private memory to improve performance.

Specifically, the present application describes a system having a shared persistent fabric-attached memory (FAM) that includes data, structured as a key-value store. Each key-value pair also has markers that are used to indicate whether the key-value pair in the local cache memory device is up-to-date. Each of multiple computing devices can access the key-value pair. During use, each computing device copies a key-value pair to an entry in its own local DRAM-resident cache whereby the key-value pair can be accessed more quickly as compared to accessing it on the shared persistent FAM. During subsequent accesses, the computing device extracts a marker flag which, when compared to the marker, indicates whether the key and value stored in the cache entry are up-to-date or not. A marker flag is a value of a marker when the associated key-value pair is read from the shared persistent FAM.

If the key and value in the cache are not current, the computing device accesses the shared persistent FAM to retrieve the up-to-date key-value pair. If the key and value are not current, the computing device must traverse the key-value store index in the shared persistent FAM to find the up-to-date key-value pair. Note that this traversal may require multiple shared persistent FAM accesses.

If the cache entry value is up-to-date, the computing device simply returns the value as stored in the cache. Such a system combines the memory efficiency of shared persistent FAM and the access speed of local cache access, all while ensuring that a computing device is accessing the most up-to-date version of the key-value pair.

The present specification also describes a method. In the method, a cache entry is retrieved from a local cache memory device paired with a computing device. The cache entry includes a key, a value to be used by the computing device, and a marker flag to determine whether the cache entry is current. The local cache memory device also includes a marker location indicating a location of a marker in a shared persistent FAM. Using the marker location, the marker is retrieved from the shared persistent FAM. Then using the marker and the marker flag, it is determined whether the cache entry is current. In this example, the shared persistent FAM is connected to the local cache memory devices of multiple computing devices.

In various examples, the system described herein includes a shared persistent FAM shared by multiple computing devices. The shared persistent FAM includes a number of entries. Each entry includes a key and a value paired with the key. The shared persistent FAM also includes a marker for each key-value entry used to determine if the key and value in cache are current. The system also includes a local cache memory device paired with a computing device. The local cache memory device includes cache entries. Each cache entry includes the key, a value paired with the key, and a marker flag to determine whether the key and value in the cache entry are current. The local cache memory device also includes a marker location.

The present specification also describes a non-transitory machine-readable storage medium encoded with instructions executable by a processor. The machine-readable storage medium includes instructions to retrieve, from a local cache memory device paired with a computing device, a cache entry. The cache entry includes 1) a key, 2) a value to be used by the computing device, and 3) a marker flag to determine whether the key and value in the cache entry are current. The local cache memory device also includes a marker location indicating a location of a marker in a shared persistent FAM. The machine-readable storage medium also includes instructions to, using the marker location, retrieve the marker from the shared persistent FAM and instructions to determine, from the marker and the marker flag, whether the cached key and value are current.

In summary, using such a system and method for determining cache currency of data values 1) provides efficient memory usage via a shared persistent FAM, or fabric-attached memory; 2) exhibits fast memory access by allowing computing devices to benefit from local cached data while still serving up-to-date data resulting from updates of other computing devices; 3) improves access times for cache hits on up-to-date data as the data is retrieved from cache as opposed to a slower shared persistent FAM; 4) improves access times for cache hits on stale data as the data is retrieved using a direct pointer, rather than traversing the shared persistent FAM key-value index; and 5) provides this increased memory performance without specialized hardware. However, it is contemplated that the devices disclosed herein may address other matters and deficiencies in a number of technical areas.

As used in the present specification and in the appended claims, the term "a number of" or similar language is meant to be understood broadly as any positive number including 1 to infinity.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may or may not be included in other examples.

FIG. 1 is a flowchart of a method (100) for determining cache currency using persistent markers, according to an example of the principles described herein. As a general note, methods (100, 400, 500, 600, 900, 1000, 1100) described herein are executed or performed by a particular computing device. Other suitable systems and/or controllers may be used as well. The methods (100, 400, 500, 600, 900, 1000, 1100) may be implemented in the form of executable instructions stored on at least one machine-readable storage medium of at least one of the devices and executed by at least one processor of at least one of the devices. Alternatively or in addition, the methods (100, 400, 500, 600, 900, 1000, 1100) may be implemented in the form of electronic circuitry (e.g., hardware). While FIGS. 1, 4, 5, 6, 9, 10, and 11 depict operations occurring in a particular order, a number of the operations of the methods (100, 400, 500, 600, 900, 1000, 1100) may be executed concurrently or in a different order than shown in FIGS. 1, 4, 5, 6, 9, 10, and 11. In some examples, the methods (100, 400, 500, 600, 900, 1000, 1100) may include more or fewer operations than are shown in FIGS. 1, 4, 5, 6, 9, 10, 11. In some examples, a number of the operations of the methods (100, 400, 500, 600, 900, 1000, 1100) may, at certain times, be ongoing and/or may repeat.

According to the method (100) shown in FIG. 1, a cache entry is retrieved (block 101) from a local cache memory device. The local cache memory device may be of any form. In one specific example, the local cache memory device may be a dynamic random-access memory (DRAM). The local cache memory device is paired with a computing device. In some examples, the local cache memory device is uniquely paired with a computing device.

The cache entry includes data that is to be used by the computing device. The cache entry includes multiple components. For example, the cache entry includes a key, which is a unique identifier for some item of data. The cache entry also includes a value, which can refer to the data itself that is to be used by the computing device or a pointer to the location of that data.

A marker location indicates a location of markers in a shared persistent FAM. The markers may take various forms. In one example, a marker is a set of version numbers for the key and value as stored in the shared persistent FAM. For example, the shared persistent FAM may store an index structure such as a hash table or a radix tree that contains key-value pair entries. In the example of a radix tree, the marker location may indicate the location where the corresponding entry is stored in the shared persistent FAM. In another example, the marker may be a series of epoch identifiers and their associated epoch signatures. In this example, the marker location is a location where the epoch identifiers, and the associated epoch signatures, are located within the shared persistent FAM.

The cache entry also includes a marker flag. The marker flag is used to determine whether the value as it is stored in the cache entry is current. For example, a key-value pair may be stored in the shared persistent FAM. A computing device may load that key-value pair into the cache. The key-value pair as it is loaded in the cache is referred to as a "cache copy" of the key-value pair and the key-value pair as it is loaded in the shared persistent FAM is referred to as a "shared memory copy" of the key-value pair. While the key-value pair is loaded in the cache of a particular computing device, another computing device of the network may make a change to the shared memory copy of the key-value pair, rendering the cache copy stale, or out-of-date. The marker flag in the cache entry is used to aid in determining whether the cache copy is up-to-date as measured against the shared memory copy of the key-value pair.

Depending on the marker, the marker flag may take a variety of forms. For example, in some cases where the marker is a set of version numbers associated with the shared memory copy of the key-value pair, the marker flag is a set of version numbers associated with the cache copy of the key-value pair.

In another example, where the marker is a set of epoch identifiers and associated epoch signatures, the marker flag is a valid epoch identifier indicating the last period of time that the cache copy of the key-value pair was guaranteed to be up-to-date.

Based on the marker location, the marker is retrieved (block 103) from the shared persistent FAM. In the example where the marker and marker flag refer to version numbers of the associated key-value pair, this may include retrieving, from a location within the index structure of the shared persistent FAM, the version numbers of both the shared memory copy of the key and the shared memory copy of the value. In the example where the marker and the marker flag refer to epoch identifiers and signatures, this may include determining, from an epoch identifier and epoch signature in the shared persistent FAM, whether the key-value pair was updated in the shared persistent FAM in the most recent epoch, or time period, by any computing device.

Note that in these examples, the collection of keys and values in the shared persistent FAM can form an index structure, such as a hash table or a radix tree and the marker locations refer to fixed locations in the shared persistent FAM. For example, the location of the epoch signatures and epoch identifiers may be a specific location on the shared persistent FAM. Using the retrieved (block 103) marker and the marker flag from the cache entry, it is determined (block 105) whether the entry is current. That is, it is determined whether the key is current and the value is current. For example, a marker may indicate that the shared memory copy version of the value is "V3" and that the shared memory copy version of the key is "K3." If the marker flag indicates that the cache copy version of the value is "V2" or "V1," and/or that the cache copy version of the key is "K2" or "K1," it can be determined that the cache entry is stale. Specifically, if the cache copy version number for the key matches the shared memory copy version number for the key, but the value version numbers do not match, the cached value is invalid, but the entry pointer read from the shared persistent FAM is correct and may be used to update the cached value and cached value pointer.

By comparison, if the cache copy version number for the key does not match the shared memory copy version for the key, then the key has been removed from the shared persistent FAM since the cache entry was last updated and a full look up may be executed. By comparison, if the marker flag indicates that the cache copy version numbers of each of the value and key match the shared memory copy version numbers, it can be determined that the cache copy of the value is up-to-date.

In another example, a most recent epoch identifier and signature may indicate that a value was updated in the shared persistent FAM at an epoch "current". If the marker flag indicates that the cache copy of that value has a last-valid epoch identifier of "current-2," it can be determined that the cache copy of the value is stale. By comparison, if the marker flag indicates that the value, as stored in cache, has an epoch identifier of "current," it can be determined that the cache version of the value is up-to-date.

In either example, following any such determination, appropriate actions can be carried out. For example, if the cache copy of the value is outdated, then the up-to-date copy from the shared persistent FAM can be copied to the local cache memory device and accessed. If the cache copy of the value is up-to-date, then the up-to-date copy can be accessed from the local cache memory device. Such a method (100) increases efficiency as it can be determined whether cached data is up-to-date. If cached data is up-to-date, a computing device can access the data more quickly, as it is more efficient to access data from cache as opposed to a shared persistent FAM. If a cached value is stale, a computing device can still access the data more quickly as, rather than traversing the key-value store index in the shared persistent FAM, the computing device can access the up-to date key-value pair on the shared persistent FAM by referencing the entry pointer which indicates the location of the up-to-date key-value pair, again avoiding a traversal of the key-value store index in the shared persistent FAM.

Figure 2:
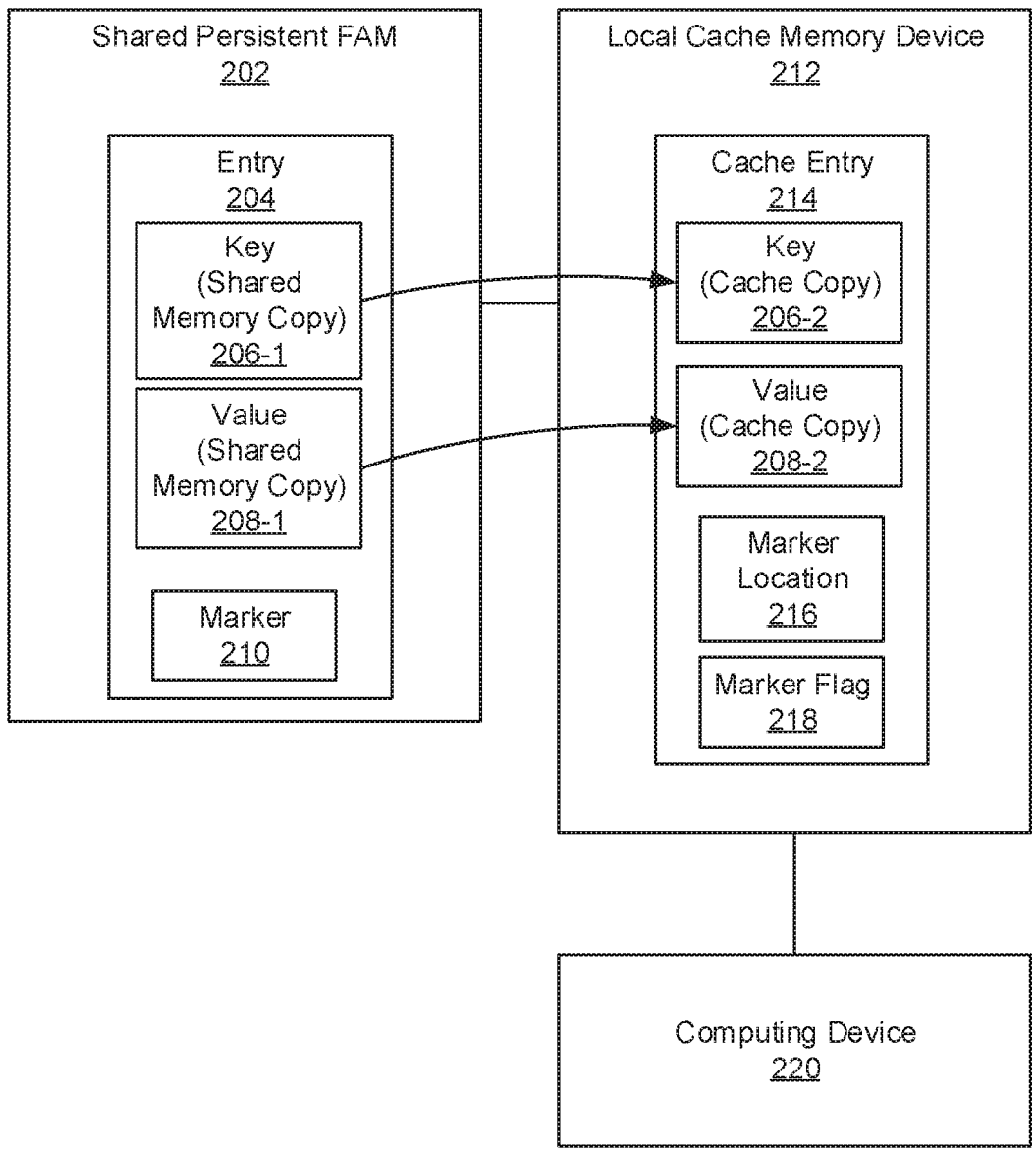
FIG. 2 is a diagram of a system for determining cache currency using persistent markers, according to an example of the principles described herein.

FIG. 2 is a diagram of a system for determining cache currency using persistent markers (210), according to an example of the principles described herein. The system includes a shared persistent FAM (202). The shared persistent FAM (202) includes a number of entries (204) that store information. The shared persistent FAM (202) may be non-volatile, meaning that it retains the information stored therein even in the absence of a power supply. The shared persistent FAM (202) is connected to local cache memory devices (212) of multiple computing devices (220). While FIG. 2 depicts a single local cache memory device (212) connected to the shared persistent FAM (202) and a single corresponding computing device (220), multiple local cache memory devices (212) and computing devices (220) may be connected to the shared persistent FAM (202).

Each of the entries (204) includes various components. For example, each entry (204) includes a shared memory copy of a key (206-1), or contains information to enable identification of a key associated with the entry, which key is a unique identifier for some item of data. The entry (204) also includes a shared memory copy of a value (208-1), which can refer to the data itself that is to be used by the computing device (220) or a pointer to the location of that data. The key (206) and value (208) are copied into a cache entry (214) of the local cache memory device (212) when an application running on an associated computing device (220) requests it. Accordingly, the cache entry (214) includes a cache copy of the key (206-2) and a cache copy of the value (208-2).

Figure 8:
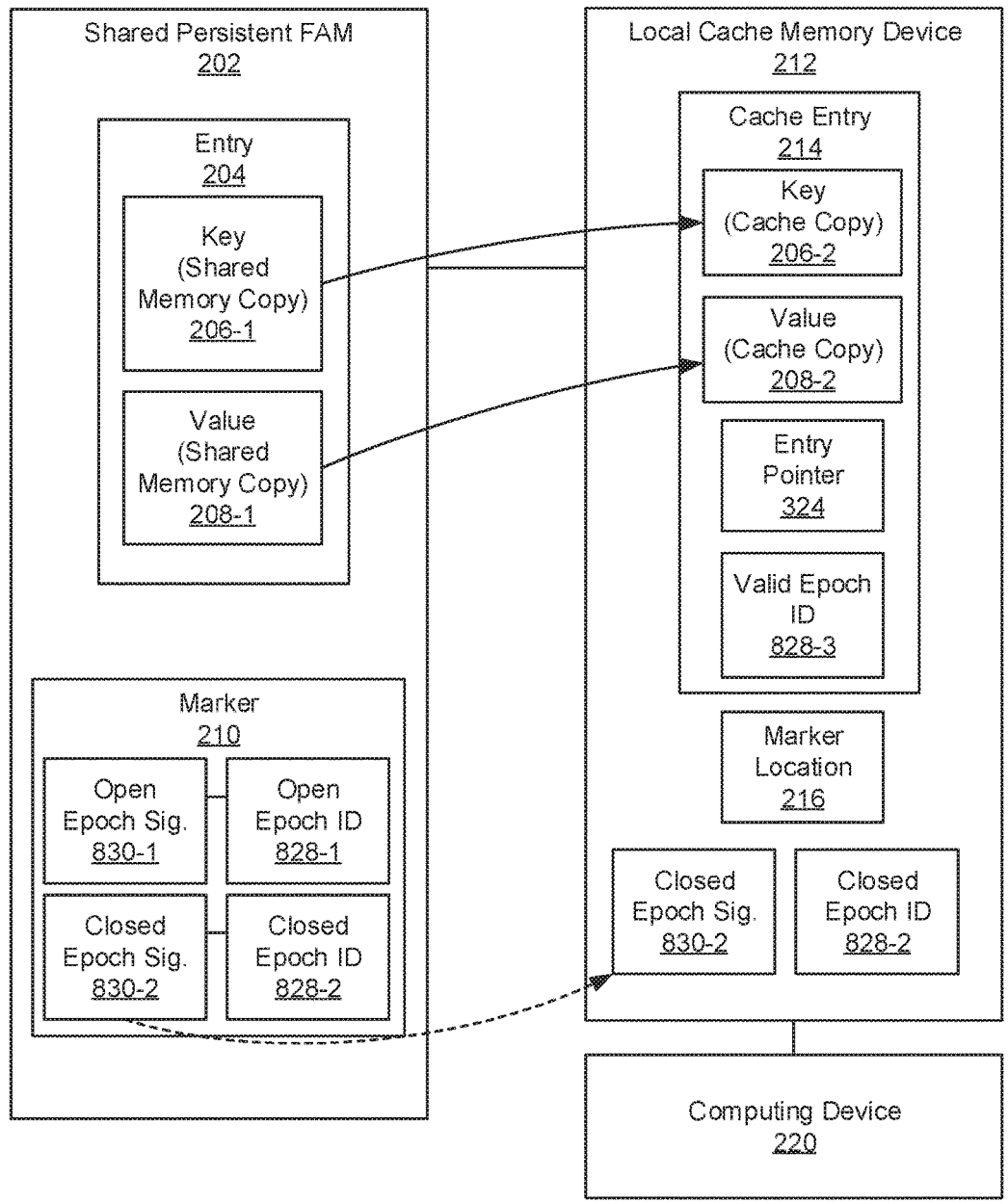
FIG. 8 is a diagram of a system for determining cache currency using persistent markers and epoch signatures, according to an example of the principles described herein.

The shared persistent FAM (202) also includes a marker (210). In some examples, as depicted in FIG. 2, the marker (210) is included in the entry (204). However, in some examples, as depicted in FIG. 8, the marker (210) is independent of the entry (204). Returning to the marker (210), the shared persistent FAM (202) includes up-to-date versions of each value (208-1). The values (208-2) as versions stored in each local cache memory device (212) may become stale as other computing devices (220) update the shared memory copy of the value (208-1) as it is stored in the shared persistent FAM (202). As described above, the marker (210) may take different forms. Examples of different forms of the marker (210) are provided in FIGS. 3 and 8.

The system also includes a local cache memory device (212) that is 1) paired with a corresponding computing device (220) and 2) connected to the shared persistent FAM (202). The local cache memory device (212) includes various cache entries (214) that include a cache copy of the key (206-2) and a value (208-2).

The local cache memory device (212) also includes a marker location (216). In some examples, as depicted in FIG. 2, the marker location (216) is included in the cache entry (214). However, in some examples, the marker location (216) is outside the entry. The marker location (216) indicates the location of the marker (210) within the shared persistent FAM (202) and a marker flag (218) that is used to determine whether the cache copy of the key (206-2) and value (208-2) are up-to-date. The marker location (216) and marker flag (218) may take various forms depending on the form of the marker (210). Examples of different forms of the marker location (216) and marker flag (218) are provided in FIGS. 3 and 8.

Figure 3:
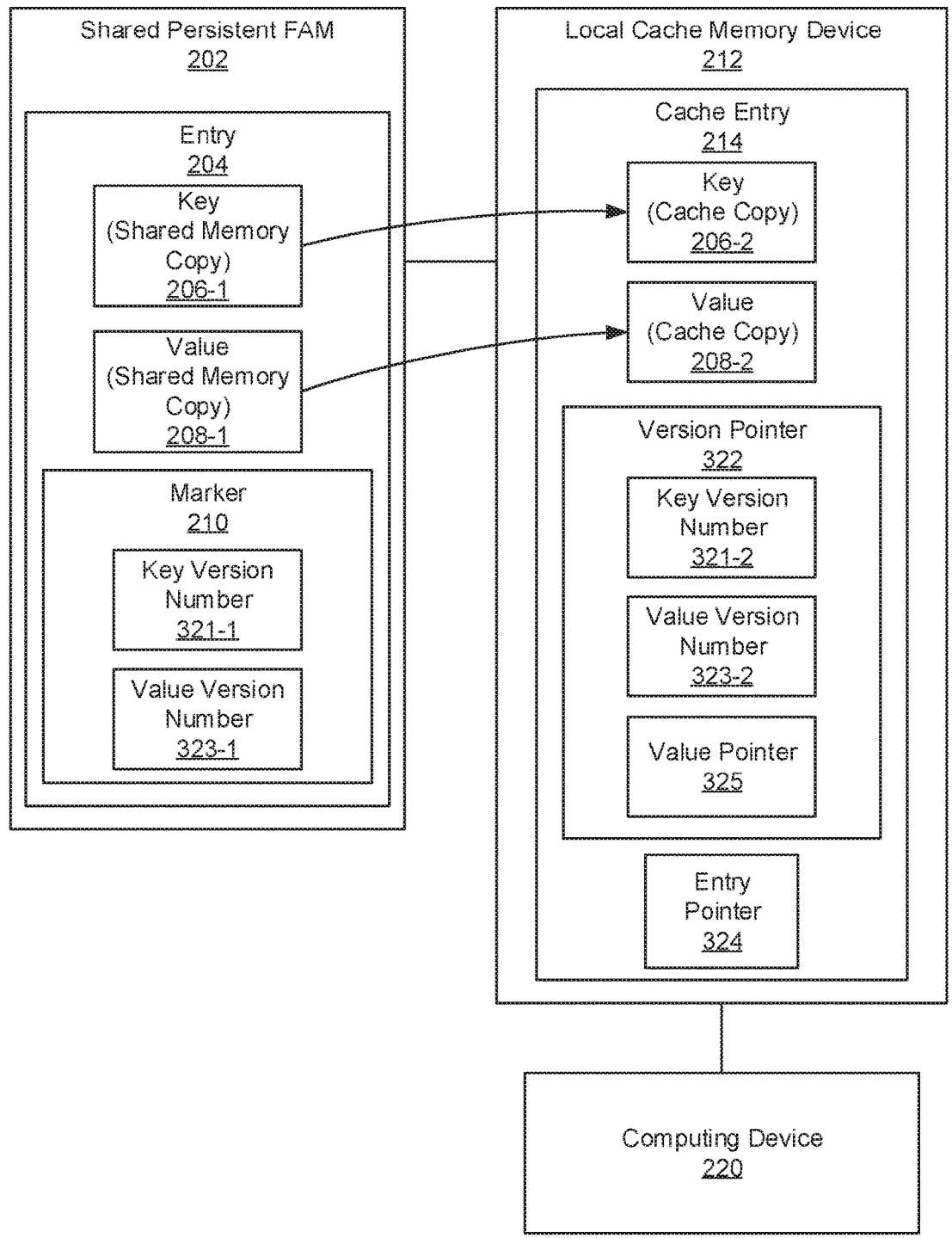
FIG. 3 is a diagram of a system for determining cache currency using persistent markers and version numbers, according to an example of the principles described herein.

FIG. 3 is a diagram of a system for determining cache currency using persistent markers (FIG. 2, 210) using version numbers (321, 323), according to an example of the principles described herein. As described above, in some examples, the markers (210) are a set of version numbers including a key version number (321-1) for a shared memory copy of the key (206-1) and a value version number (323-1) for a shared memory copy of the value (208-1). In this example, each version number (321-1, 323-1) is included in an entry (204) of the shared persistent FAM (202). The version numbers (321-1, 323-1) indicate the up-to-date versions of the shared memory copies of the key (206-1) and value (208-1). For example, as a shared memory copy of the value (208-1) is updated, the version number for the value (323-1) is increased. Similarly, as a shared memory copy of the key (206-1) is updated (e.g., the key is deleted and a new key is inserted using the unused entry), the version number for the key (321-1) is increased. When copied to the local cache memory device (212), these version numbers (321, 323) are also copied as part of a version pointer (322) of the cache entry (214). That is, the version pointer (322) is the marker flag (FIG. 2, 218) described above, which version pointer (322) includes a key version number (321-2) for the cache copy of the key (206-2), a value version number (323-2) for the cache copy of the value (208-2) and a value pointer (325) to the shared memory copy of the value (208-1).

However, after being copied to the local cache memory device (212), the shared memory copy of the value (208-1) may be updated and the corresponding value version number (323-1) increased. For example, upon copying to the local cache memory device (212), the value version number (323-2) may be V2 and that value may be copied to the version pointer (322). At a subsequent point in time, the shared memory copy of the value (208-1) may be updated such that the value version number (323-1) increases to V3, thus differing from the cache version, V2, indicated in the version pointer (322). In addition to the key version number (321-2) and the value version number (323-2), the version pointer (322) also includes a value pointer (325) to the shared memory copy of the value (208-1) stored in the shared persistent FAM (202).

Similarly, after being copied to the local cache memory device (212), the key (206-1) may be logically deleted from the key-value store and the shared memory entry (204) recycled to store a newly inserted key. When the shared memory copy of the key (206-1) is updated, the corresponding key version number (321-1) is increased. For example, upon copying to the local cache memory device (212), the key version number (321-2) may be K12 and that value may be copied to the version pointer (322). At a subsequent point in time, the shared memory copy of the key (206-1) may be updated such that the key version number (321-1) increases to K13, thus differing from the cache version, K12, indicated in the version pointer (322).

In this example, the marker location (FIG. 2, 216) may be an entry pointer (324) that indicates the location of the entry (204) and its corresponding marker (210), i.e., version numbers (321-1, 323-1), in the shared persistent FAM (202). In this example, determining whether the cache copy of the key (206-2) and value (208-2) is current includes 1) comparing the key version number (321-2) of the cache copy of the key (206-2) with the key version number (321-1) of the shared memory copy of the key (206-1) and 2) comparing the value version number (323-2) of the cache copy of the value (208-2) with the value version number (323-1) of the shared memory copy of the value (208-1). If the value version numbers (323) are the same and the key version numbers (321) are the same, it can be determined that the cache copy of the key (206-2) and value (208-2) is up-to-date. If the version number (321, 323) pairs are not the same, it can be determined that the cache copy of the key (206-1) and value (208-2) are stale.

Figure 4:
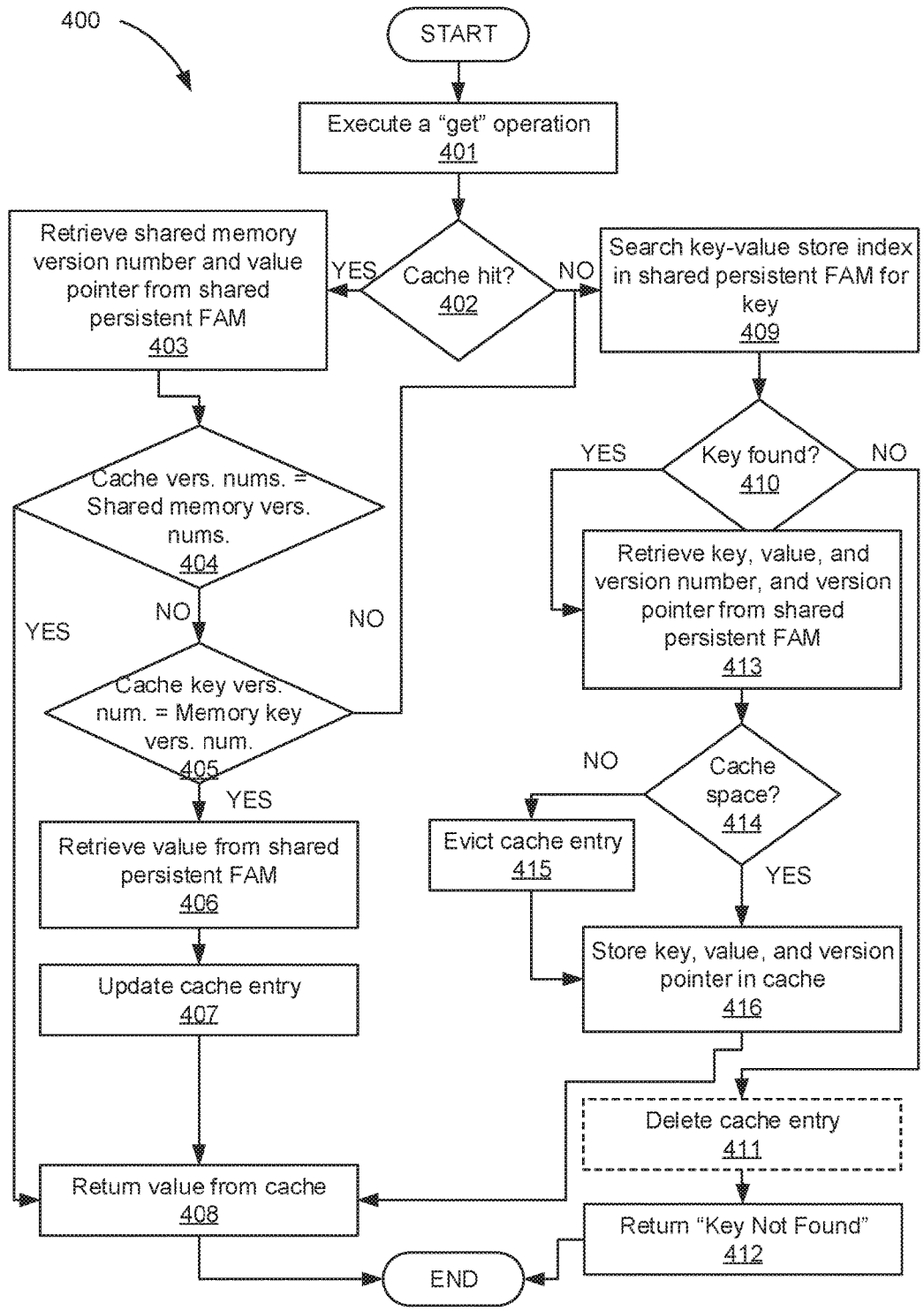
FIG. 4 is a flowchart of a method for performing a read operation and determining cache currency using persistent markers and version numbers, according to an example of the principles described herein.

FIG. 4 is a flowchart of a method (400) for performing a "get" (read) operation and determining cache currency using persistent markers and version numbers (FIG. 3, 321, 323), according to an example of the principles described herein. That is, in this method (400), the marker (FIG. 2, 210) are shared memory version numbers (FIG. 3, 321-1, 323-1), the marker location (FIG. 2, 216) is a shared memory address (FIG. 3, 324) for the entry (FIG. 2, 204), and the marker flag (FIG. 2, 218) is a version pointer (FIG. 3, 322) that includes a cache key version number (FIG. 3, 321-2), a cache value version number (FIG. 3, 323-2) and a pointer (FIG. 3, 324) to a value (FIG. 2, 208-1) in the shared persistent FAM (FIG. 2, 202).

In this example, a "get" operation is executed (block 401) which operates to retrieve a value (FIG. 2, 208) corresponding to a key (FIG. 2, 206) for the computing device (FIG. 2, 220). It is determined (block 402) whether there is a "hit" in the local cache memory device (FIG. 2, 212). A hit in the local cache memory device (FIG. 2, 212) indicates that the local cache memory device (FIG. 2, 212) includes a copy of the entry (FIG. 2, 214). If there is a cache hit (block 402, determination YES), a shared memory version number (FIG. 3, 323-1) and value pointer are retrieved (block 408) from the shared persistent FAM (FIG. 2, 202). This may be retrieved based on the entry pointer (FIG. 3, 324) included in the cache entry (FIG. 2, 214). That is, rather than traversing the key-value store index structure in the shared persistent FAM (FIG. 2, 202), the exact location of the entry (FIG. 2, 204) is identified by the entry pointer (FIG. 3, 324).

It is then determined (block 404) if the cache version numbers (FIG. 3, 321-2, 323-2), as included in the version pointer (FIG. 3, 322) equal the shared memory version numbers (FIG. 3, 321-1, 323-1). If the cache key version number (FIG. 3, 321-2) equals the shared memory key version (FIG. 3, 321-1) and the cache value version number (FIG. 3, 323-2) equals the shared memory value version (FIG. 3, 323-1) (block 404, determination YES), it may be concluded that the cache copy of the key (FIG. 2, 206-2) and value (FIG. 2, 208-2) are current. In this case, the cache copy of the value (FIG. 2, 208-2) may be returned (block 408), thus avoiding having to traverse the entire KVS structure in the shared persistent FAM (FIG. 2, 202) to identify the up-to-date value.

If the cache version numbers (FIGS. 3, 321-2 and 323-2) do not equal the shared memory version numbers (FIG. 3, 321-1, 323-1), (block 404, determination NO), it may be concluded that the cache copy of the key (FIG. 2, 206-2) and value (FIG. 2, 208-2) are stale. It is then determined if the key version numbers (FIGS. 3, 321-1 and 321-2) are the same (block 405). If the key version numbers (FIG. 3, 321-1 and 321-2) match (block 405, determination YES) while the value version numbers (FIGS. 3, 323-1 and 323-2) differ, it is determined that the cached value is invalid. However, the version pointer read (block 403) from the shared persistent FAM (FIG. 2, 202) is correct and may be used to update the cached value and cached version pointer. In this case, the shared memory copy of the value (FIG. 2, 208-1) is retrieved (block 406) from the shared persistent FAM (FIG. 2, 202). In this example, the cache entry (FIG. 2, 214) is updated (block 407). That is, the cache copy of the value (FIG. 2, 208-2) is overwritten with the shared memory copy of the value (FIG. 2, 208-1). Also, the cached version pointer (FIG. 3, 322) is updated. That is, the cache value version number (FIG. 3, 323-2) is updated to reflect the shared memory value version number (FIG. 3, 323-1), and the value pointer (FIG. 3, 325) is updated to the location of the shared memory copy of the value (FIG. 2, 208-1) (as retrieved in block 403). Accordingly, the updated value now stored in the cache is returned (block 408). In this case, time is still saved as the entry pointer (FIG. 3, 324) is still valid and may be used to directly retrieve the shared memory copy of the value (FIG. 2, 208-1), rather than traversing the key-value store index in the shared persistent FAM (FIG. 2, 202).

In the case that the key version numbers (FIGS. 3, 321-1 and 323-2) do not match (block 405, determination NO), then the requested key has been removed from the key-value store since the cache entry (FIG. 2, 214) was last updated. Accordingly, the key-value store index in the shared persistent FAM (FIG. 2, 202) is searched (block 409) to locate the shared memory copy of the key (FIG. 2, 206-1).

In the case that a cache hit is not detected, i.e., there is a cache miss, (block 402, determination NO), the key-value store index in the shared persistent FAM (FIG. 2, 202) is searched (block 409) to look up the shared memory copy of the key (FIG. 2, 206-1). If the shared memory copy of the key (FIG. 2, 206-1) is not found (block 410, determination NO), the cache entry is deleted (block 411) and a result of "key not found" or other indication is returned (block 412).

Note that in some cases, block 411 may be bypassed. For example, if there is a cache hit (block 402, determination YES), the cache version numbers do not match the shared memory version numbers (block 404, determination NO), and the cache key version number (FIG. 3, 321-2) does not match the shared key version number (FIG. 3, 321-1) (block 405, determination NO) which leads to a search (block 409) of the key-value store. Then, if the shared memory copy of the key (FIG. 2, 206-1) is not found (block 410, determination NO), the cache entry (FIG. 2, 214) is deleted (block 411) and a "key not found" indication returned (block 412) as described. However, if there is a cache miss (block 402, determination NO) which leads to a search (block 409) of the key-value store, then if the shared memory copy of the key (FIG. 2, 206-1) is not found (block 410, determination NO), block 411 is bypassed and a result of "key not found" or other indication is returned (block 412).

If the shared memory copy of the key (FIG. 2, 206-1) is found (block 410, determination YES), the shared memory copy of the key (FIG. 2, 206-1) and value (FIG. 2, 208-1) as well as the version pointer and the version numbers (FIG. 3, 321-1, 323-1) from the shared persistent FAM (FIG. 2, 202) are retrieved (block 413). If there is sufficient space in the local cache memory device (FIG. 2, 212) to store the retrieved data (block 414, determination YES), the information is stored (block 416) in the cache entry (FIG. 2, 214) and the now updated value (FIG. 2, 208-2) found in the cache entry (FIG. 2, 214) is returned (block 408). However, if there is not sufficient space in the local cache memory device (FIG. 2, 212) to store the retrieved data (block 414, determination NO), a cache entry (FIG. 2, 214) is evicted (block 415) to create space for the new information. At this point, the information is stored (block 416) in the cache entry (FIG. 2, 214) and the now updated value (FIG. 2, 208-2) found in the cache entry (FIG. 2, 214) is returned (block 408).

Figure 5:
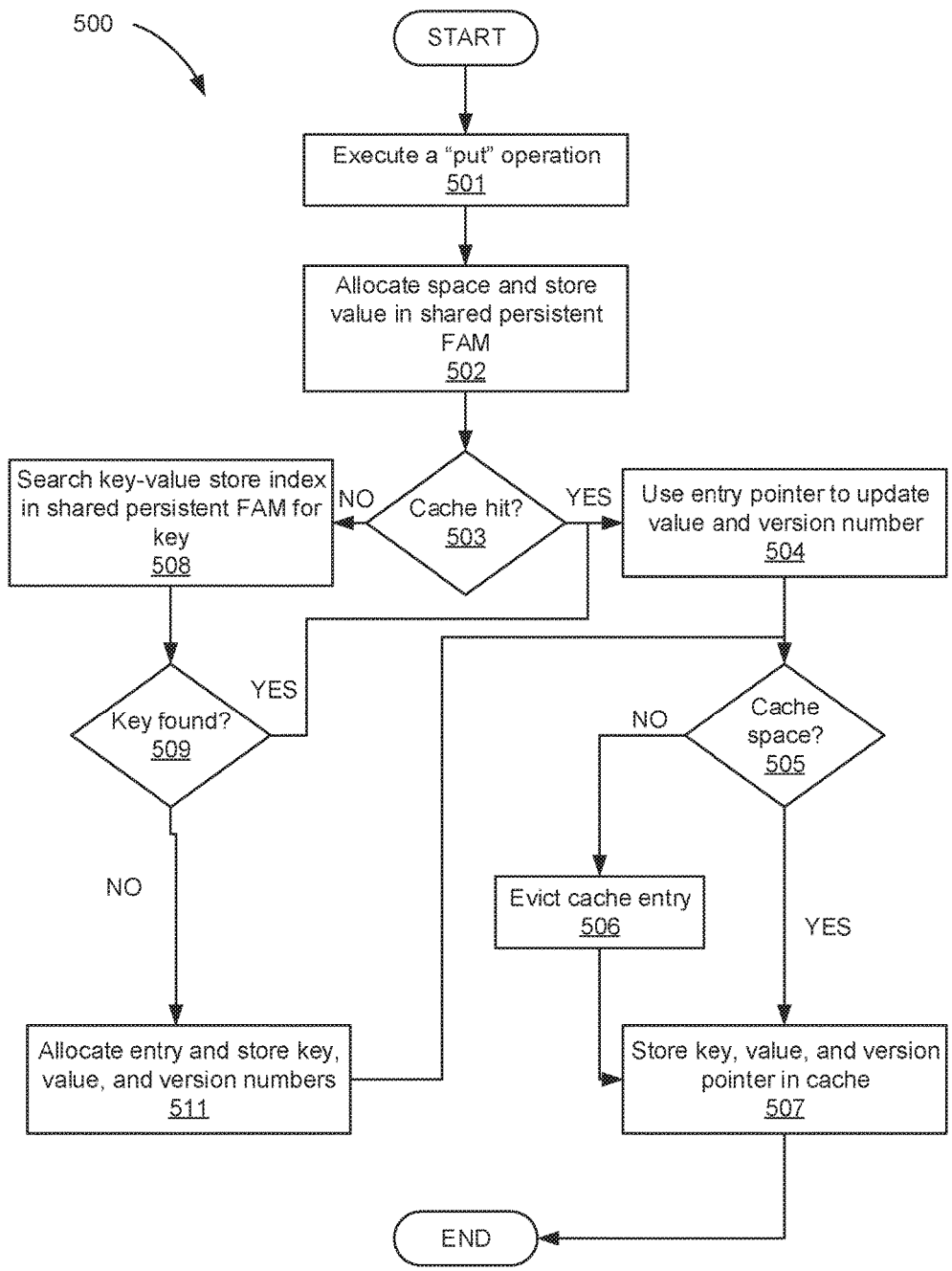
FIG. 5 is a flowchart of a method for performing a write operation and determining cache currency using persistent markers and version numbers, according to an example of the principles described herein.

FIG. 5 is a flowchart of a method (500) for performing a "put" (write) operation and determining cache currency using persistent markers and version numbers (FIG. 3, 321, 323), according to an example of the principles described herein. That is, in this method (500), the marker (FIG. 2, 210) is a set of memory version numbers (FIG. 3, 321, 323), the marker location (FIG. 2, 216) is a shared memory address (FIG. 3, 324) for the entry (FIG. 2, 204), and the marker flag (FIG. 2, 218) is a version pointer (FIG. 3, 322) that includes a cache key version number (FIG. 3, 321-2), a cache value version number (FIG. 3, 323-2) and a value pointer (FIG. 3, 325) in the shared persistent FAM (FIG. 2, 202).

In this example, a "put" operation is executed (block 501), which operates to place a value that is identified by an associated key in the shared persistent FAM (FIG. 2, 202). If the key already exists in the key-value store, the value is updated with the newly supplied value. If the key does not exist, then both the key and value are inserted into the key-value store. Accordingly, space in the shared persistent FAM (FIG. 2, 202) is allocated for the value to be stored, and the requested value is written to the newly allocated space (block 502). It is then determined (block 503) whether there is a "hit" to the local cache memory device (FIG. 2, 212). A hit in the local cache memory device (FIG. 2, 212) indicates that the local cache memory device (FIG. 2, 212) includes a copy of the key (FIG. 2, 206-2) and value (FIG. 2, 208-2). If there is a cache hit (block 503, determination YES), the entry pointer (FIG. 3, 324) as found in the cache entry (FIG. 2, 214) is used (block 504) to update the value (FIG. 2, 208-1) in the shared persistent FAM (FIG. 2, 202) and its corresponding value version number (FIG. 3, 323-1).

As part of this update, it is verified that the key version number (FIG. 3, 321-2) for the cache copy of the key (FIG. 3, 206-2) matches the key version number (FIG. 3, 321-1) for the shared memory copy of the key (FIG. 3, 206-1). The shared memory copy of the value (FIG. 3, 208-1) and its version number (FIG. 3, 323-1) are updated when the key version numbers (FIG. 3, 321) match. If the key version numbers (FIG. 3, 321) match, the shared memory copy of the value (FIG. 3, 208-1) and its value version number (FIG. 3, 323-1) are updated. If the key version numbers (FIG. 3, 321) do not match, then the key was deleted from the key-value store since the last cache update, and the key-value store index in the shared persistent FAM (FIG. 2, 202) is searched to find the shared memory copy of the entry (FIG. 3, 204). If it is found, the shared memory copy of the value (FIG. 3, 208-1) and its version number (FIG. 3, 323-1) are then updated. This persistently updates the value, and makes the new value visible to other computing devices.

To service subsequent requests on this computing device more efficiently, the new key-value data is also stored in the local cache memory device (FIG. 2, 212). If there is sufficient space in the local cache memory device (FIG. 2, 212) to store the newly updated data (block 505, determination YES), the information is stored (block 507) in the cache entry (FIG. 2, 214) and an indication returned that the write operation was successful. However, if there is not sufficient space in the local cache memory device (FIG. 2, 212) to store the newly updated data (block 505, determination NO), a cache entry (FIG. 2, 214) is evicted (block 506). At this point, the updated information is stored (block 507) in the cache entry (FIG. 2, 214) and an indication returned that the write operation was successful.

In the case that a cache hit is not detected, i.e., there is a cache miss, (block 503, determination NO), the key-value store index in the shared persistent FAM (FIG. 2, 202) is searched (block 508) to find the shared memory copy of the requested key (FIG. 2, 206-1). If the shared memory copy of the key (FIG. 2, 206-1) is not found (block 509, determination NO), a key structure is allocated (block 511). More specifically, space is allocated in shared persistent FAM (FIG. 2, 202) for the key structure, and the key (FIG. 2, 206-1) and pointer to the newly allocated/stored value (block 502) are stored in the new key structure, as well as the appropriate key version number (FIG. 3, 321-1) and value version number (FIG. 3, 323-1), as described below. The completed entry is then inserted into the key-value store index. If the shared memory copy of the key (FIG. 2, 206-1) is found (block 509, determination YES), the entry pointer as found in shared persistent FAM (FIG. 2, 202) is used to update (block 504) the value (FIG. 2, 208-1). The entry pointer (FIG. 3, 324) is used to request the existing version pointer (value pointer, key version, value version) (as in FIG. 4, 403). The new value is updated using an all-or-nothing operation to atomically switch the value version pointer in the shared persistent FAM (FIG. 2, 202) to include the pointer to the newly allocated and stored value (block 502), the same key version, and the value version for newly allocated value. In either case, it is determined if there is sufficient space in the local cache memory device (FIG. 2, 212) to store the updated data (block 505) and subsequent operations performed as described above.

As described above, space is allocated (block 502) in the shared persistent FAM (FIG. 2, 202) for a new entry (FIG. 3, 204) either by 1) creating a new data structure in shared persistent FAM (FIG. 2, 202) or 2) by reusing an existing data structure that is no longer in use. For example, when a key is repeatedly removed and reinserted into the store, rather than reclaiming the corresponding entry (FIG. 3, 204) in shared persistent FAM (FIG. 2, 202), the entry value (FIG. 3, 208-1) is changed to "invalid" and the value version number (FIG. 3, 323-1) is incremented in an atomic, or all-or-nothing, fashion. (The key version number (FIG. 3, 321-1) remains constant). This approach allows the entry (FIG. 3, 204) to be easily reused if the same key (FIG. 3, 206-1) is subsequently updated, and keeps cache copies of the cache entry (FIG. 3, 214) alive longer. This means that cache entries to deleted key nodes are still usable, although any non-invalid cached values (FIG. 3, 208-2) are incorrect.

A non-structural entry (FIG. 3, 204), even though it is still in the key-value store index, is then added to a pool for reallocation; this operation is performed atomically with the value invalidation and value version increment. As used in the present specification and in the appended claims, the term "non-structural" refers to a data structure that just holds the data for a key-value pair entry and does not serve an additional role in the structure of the key-value store index. As a specific example, a leaf node of a radix tree is non-structural, whereas an internal node is structural.

Upon an allocation request, if an entry with the requested key is not available, an entry is removed from the pool and its key version number (FIG. 3, 321-1) is incremented. The entry may then have a new key (FIG. 3, 206-1) and value (FIG. 3, 208-1) assigned to it and be inserted into the key-value store index. Concurrency control is applied to ensure that competing operations (e.g., one thread attempting to reallocate an entry from the pool and another thread trying to establish a new value for the deleted key that the entry represents) do not produce inconsistent results.

Figure 6:
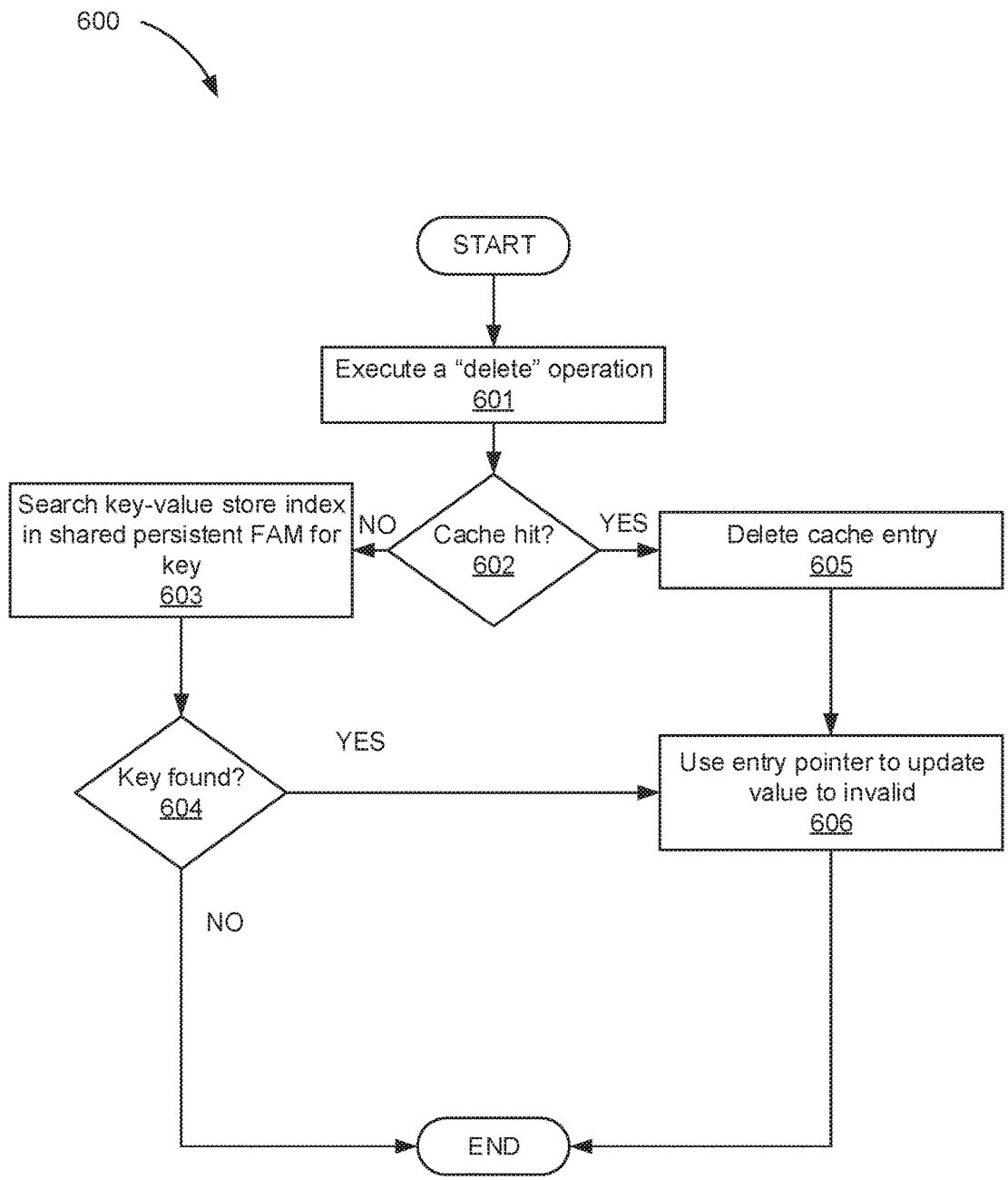
FIG. 6 is a flowchart of a method for performing a delete operation and determining cache currency using persistent markers and version numbers, according to an example of the principles described herein.

FIG. 6 is a flowchart of a method (600) for performing a delete operation and determining cache currency using persistent markers and version numbers (FIG. 3, 321, 323), according to an example of the principles described herein. That is, in this method (600), the marker (FIG. 2, 210) includes shared memory version numbers (FIG. 3, 321-1, 323-1), the marker location (FIG. 2, 216) is a shared memory address (FIG. 3, 324) for the entry (FIG. 2, 204), and the marker flag (FIG. 2, 218) is a version pointer (FIG. 3, 322) that includes a cache key version number (FIG. 3, 321-2), a cache value version number (FIG. 3, 323-2) and a pointer to a value (FIG. 2, 208-1) in the shared persistent FAM (FIG. 2, 202).

In this example, a "delete" operation is executed (block 601), which operates to remove a key and its associated value from the key-value store. It is determined (block 602) whether there is a "hit" in the local cache memory device (FIG. 2, 212). A hit in the local cache memory device (FIG. 2, 212) indicates that the local cache memory device (FIG. 2, 212) includes a copy of the key (FIG. 2, 208-1) and value (FIG. 2, 208-2). If there is a cache hit (block 602, determination YES), the cache entry (FIG. 2, 214) is deleted (block 605) from the local cache memory device (FIG. 2, 212). Then, the entry pointer (FIG. 3, 324) as found in the cache entry (FIG. 2, 214) is used (block 606) to update the shared memory copy of the entry. As described above, as part of this update, it is verified that the key version number (FIG. 3, 321-2) for the cache copy of the key (FIG. 3, 206-2) matches the key version number (FIG. 3, 321-1) for the shared memory copy of the key (FIG. 3, 206-1). The shared memory copy of the value (FIG. 3, 208-1) and its version number (FIG. 3, 323-1) will be updated when the key version numbers (FIG. 3, 321) match. If the key version numbers (FIG. 3, 321) do not match, then the key was deleted from the key-value store since the last cache update, and the key-value store index in the shared persistent FAM (FIG. 2, 202) is searched to find the shared memory copy of the entry (FIG. 3, 204). If it is found, the shared memory copy of the value (FIG. 3, 208-1) and its version number (FIG. 3, 323-1) are then updated. As described earlier, if the entry (FIG. 3, 204) is non-structural, it is also added to a pool for reallocation.

In the case that a cache hit is not detected, i.e., there is a cache miss (block 602, determination NO), the key-value store index in the shared persistent FAM (FIG. 2, 202) is searched (block 603) to find the shared memory copy of the key (FIG. 2, 206-1). If the shared memory copy of the key (FIG. 2, 206-1) is not found (block 604, determination NO), an indication of successful request completion is returned. If the shared memory copy of the key (FIG. 2, 206-1) is found (block 604, determination YES), the shared memory copy of the value (FIG. 2, 208-1) is updated (block 606) to invalid and the value version number (FIG. 3, 323-1) in the shared persistent FAM (FIG. 2, 202) is incremented. As described earlier, if the entry (FIG. 2, 204) is non-structural, it is also added to a pool for reallocation.

Figure 7:
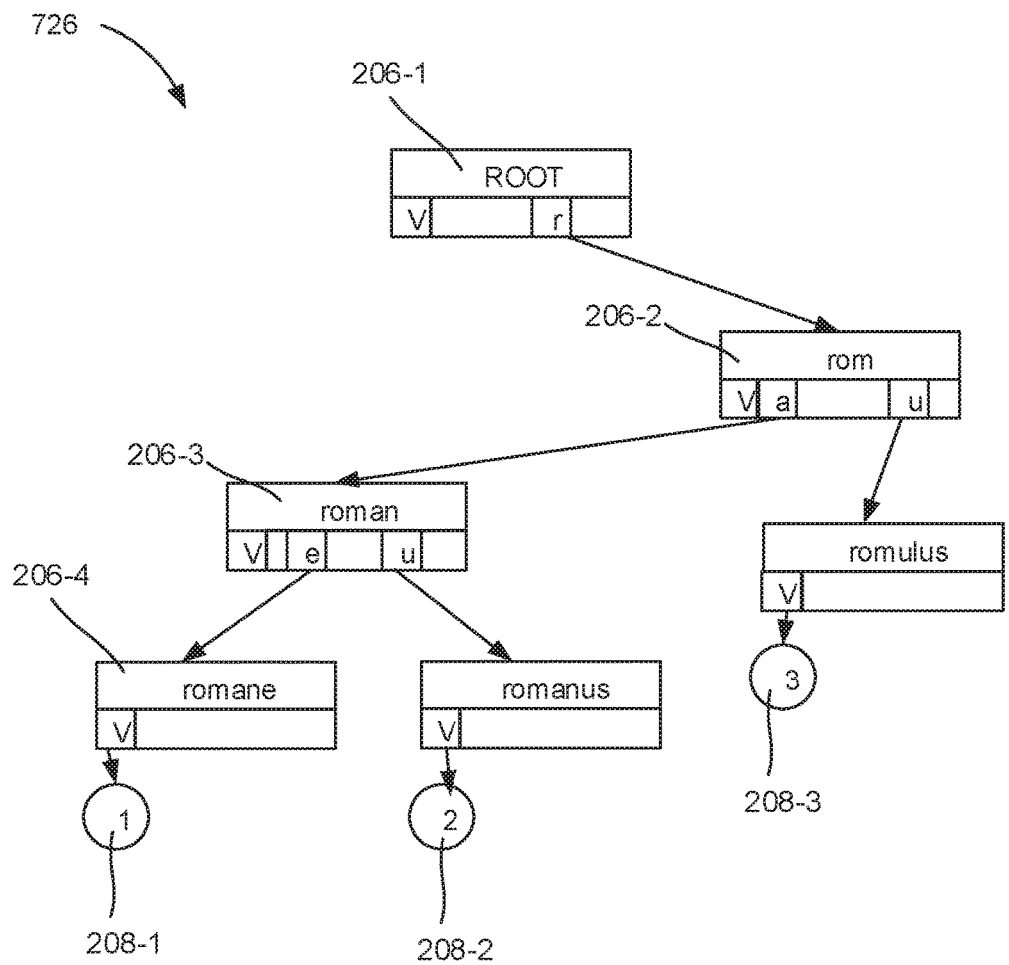
FIG. 7 is a diagram of a radix tree persistent memory index, according to an example of the principles described herein.

FIG. 7 is a diagram of a radix tree persistent memory index (726), according to an example of the principles described herein. As described above, the key-value pairs as stored in the shared persistent FAM (FIG. 2, 202) may be an index structure such as a radix tree. While specific reference is made to a radix tree, other examples are possible including a hash table. In a radix tree there are various levels of organization with different keys (206-1, 206-2, 206-3, 206-4) and values (208-1, 208-1, 208-3). In traversing the key-value store index as described above, a user moves through each level of the hierarchy to find a particular key (206-1). However, an entry pointer (FIG. 3, 324) may include the location of a particular key (FIG. 2, 206) such that traversal may be avoided. For example, an entry pointer (FIG. 3, 324) may include an entry pointer to the key "romane" such that during the various operations, traversal is avoided and a computing device (FIG. 2, 220) can directly access the key (206-4) "romane" and its associated value (208-1). In this example, the entry for key (206-4) "romane" is a non-structural entry, whereas the entry for key (206-2) "rom" is a structural entry.

FIG. 8 is a diagram of a system for determining cache currency using persistent markers using epoch signatures (830), according to an example of the principles described herein. As described above, in some examples, the marker (FIG. 2, 210) is a series of epoch identifiers (828) and their associated epoch signatures (830). In this example, an epoch represents a time period. Accordingly, a timeline includes a series of epochs. An epoch identifier (828) identifies an epoch and is like a counter value for how many epochs have passed since a beginning point in time. For every epoch, there is an epoch signature (830) that records shared memory copies of keys (206-1) that are updated for that particular period of time. Accordingly, whenever a computing device (220) updates, inserts, or deletes a shared memory copy of a key (206-1) or value (208-1), that key is added to the open epoch signature (830-1). Accordingly, if a key (206) is found in an epoch signature (830), it can be determined that it was updated during that epoch, The epoch signatures (830) may be open (830-1), of which there is only one at a time, or closed (830-2). There may be multiple closed epoch signatures (830-2) as described below. An open epoch signature (830-1) and its corresponding identifier (828-1) refer to an epoch that is current, whereas a closed epoch signature (830-2), which is non-writeable, and its corresponding identifier (828-2) refer to an epoch what is not current.

Each key (206) is only updated once per epoch, such that when a particular key (206) is updated a second time, an open epoch signature (830-1) is closed and a new open epoch signature (830-1) is initialized. Accordingly, whether or not a cache copy of a key (206-2) and value (208-2) is current can be determined based on an epoch ID (828) for the last epoch signature (830) in which the key (206) is found.

In this example, the epoch signatures (830) and epoch identifiers (828) are stored in a predetermined location on the shared persistent FAM (FIG. 2, 202). Accordingly, the marker location (216) in the local cache memory device (212) is the memory address of this epoch information.

In this example, the marker flag (FIG. 2, 218) is a valid epoch identifier (828-3), which indicates the epoch during which the cache copy of the value (208-2) can be guaranteed to be up-to-date. For example, when the shared memory copy of the key (206-1) and value (208-1) are copied to the local cache memory device (212), the valid epoch ID (828-3) is copied to the local cache memory device (212). This valid epoch ID (828-3) may correspond to the currently open epoch ID (828-1) if the key was updated during the current epoch, or otherwise the most recently closed epoch ID (828-2), as the key may be updated during the current epoch in the future. If the shared memory copy of the value (208-1) is changed by another computing device, the open epoch ID (828-1) in the shared persistent FAM (202) may advance such that the cache copy of the key (206-2) and the value (208-2), which was valid as of the valid epoch ID (828-3), is stale.

Accordingly, in this example, determining whether a cache copy of the key (206-2) and the value (208-2) is current includes identifying, via epoch identifiers (828), a most recent epoch signature (830) that indicates that the shared memory copy of the key (206-1) and value (208-1) was modified, and comparing this most recent epoch identifier against the valid epoch identifier (828-3) of the cache entry (214) in the local cache memory device (212).

For example, upon copying to the local cache memory device (212), the valid epoch identifier (828-3) may be epoch 6. At a subsequent point in time, the shared memory copy of the key (206-1) and the value (208-1) may be updated in an epoch 8, thus differing from the cache entry's valid epoch identifier. At some point in time, it is determined that the most recent epoch in which the shared memory copy of the key (206-1) and the value (208-1) was updated is epoch 8, which is newer than the cache entry's valid epoch ID (828-3), i.e., epoch 6. Accordingly, it can be determined that the cache copy of the key (206-2) and the value (208-2) is stale.

In some examples, periodically, the closed epoch signatures (830-2) may be copied to the local cache memory device (212). In some cases, the closed epoch signatures (830-2) on the local cache memory device (212) are reorganized, to be space efficient and easy to search so that they are better suited for caching in the local cache memory device (212).

Accordingly, the identification of the most recent epoch signatures (830) that includes the shared memory copy of the key (206-1) and value (208-1) includes both searching the closed signatures (830-2) in the local cache memory device (212) and the open signature (830-1) in the shared persistent FAM (202). Searching the local cache memory device (212) and the shared persistent FAM (202) simultaneously may be beneficial in that searching the local cache memory device (212) is faster such that a determination of the most recent epoch signatures is more quickly made. In this example, either periodically, or continuously via a background application, old closed epoch signatures (830-2) can be removed from the local cache memory device (212).

To remove a closed epoch signature (830-2), a reclamation ensures that the cache entries (214) stored in the local cache memory device (212), which are valid as of valid epoch ID (828-3), are at least as recent as the closed epoch ID (828-2) corresponding to the epoch signature to be removed. If any cache entry (214) has a valid epoch ID (828-3) older than the closed epoch ID (828-2), then the closed epoch signatures (830-2) would still be used to determine whether the cache entry (214) is up-to-date. If such a very stale cache entry (214) is detected, it can be refreshed by searching the closed signatures (830-2) in the local cache memory device (212) to determine whether the cache entry (214) has been superseded by a more recent update. If so, the cache entry (214) may be updated by using the entry pointer (324) to retrieve the shared memory copy of the value (208-1), which will be cached in the cache entry (214). The cache entry's valid epoch ID (828-3) will be updated as described earlier. Once all cache entries (214) are sufficiently up-to-date, such that a closed epoch signature is unnecessary, it can be removed.

Figure 9:
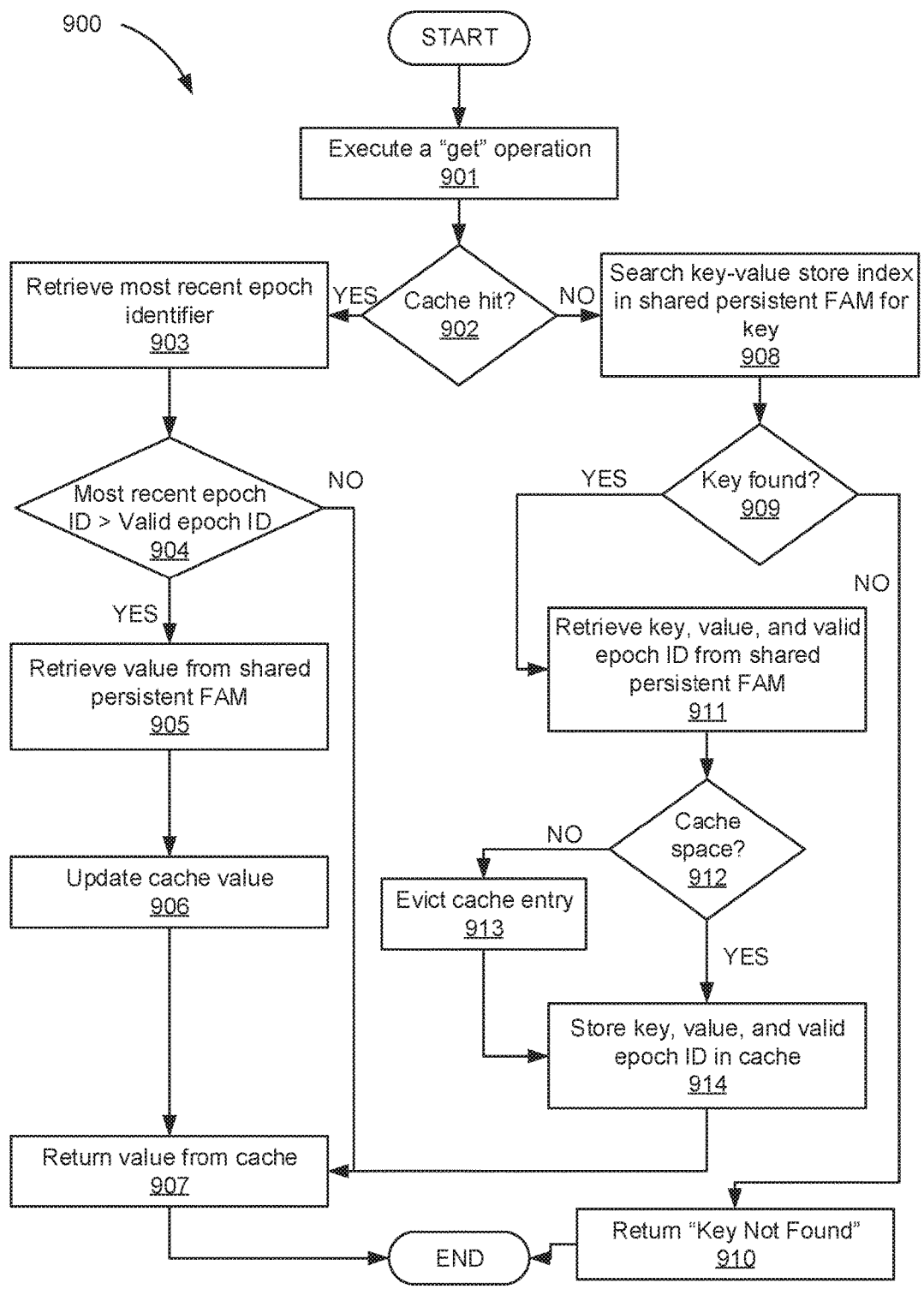
FIG. 9 is a flowchart of a method for performing a read operation and determining cache currency using persistent markers and epoch signatures, according to an example of the principles described herein.

FIG. 9 is a flowchart of a method (900) for performing a "get" (read) operation and determining cache currency using persistent markers and epoch signatures (FIG. 8, 830), according to an example of the principles described herein. That is, in this method (900), the marker (FIG. 2, 210) is a set of epoch identifiers (FIG. 8, 828) and corresponding epoch signatures (FIG. 8, 830) that describe which keys (FIG. 2, 206-1) in the shared persistent FAM (FIG. 2, 202) were updated during a series of epochs, the marker location (FIG. 2, 216) is a memory address where the epoch identifiers (FIG. 8, 828) and epoch signatures (FIG. 8, 830) are stored, and the marker flag (FIG. 2, 218) is a valid epoch identifier (FIG. 8, 828-3) that identifies the last epoch in which the cache entry (FIG. 2, 214) is guaranteed to be up-to-date.

In this example, a "get" operation is executed (block 901), which operates to retrieve a value (FIG. 2, 208) for the requested key (FIG. 2, 206) for the computing device (FIG. 2, 220). It is determined (block 902) whether there is a "hit" in the local cache memory device (FIG. 2, 212). A hit in the local cache memory device (FIG. 2, 212) indicates that the local cache memory device (FIG. 2, 212) includes a copy of the key (FIG. 2, 206-2) and the value (FIG. 2, 208-2). If there is a cache hit (block 902, determination YES), it is determined whether the cache copy of the value (FIG. 2, 208-2) is up-to-date by retrieving (block 903) the most recent epoch identifier (FIG. 8, 828) which indicates the shared memory copy of the key (FIG. 2, 206-1) and value (FIG. 2, 208-1). This includes looking for the shared memory copy of the key (FIG. 2, 206-1) in the epoch signatures (FIG. 8, 830), which includes looking in the open epoch signature (FIG. 8, 830-1) on the shared persistent FAM (FIG. 2, 202) and the closed epoch signatures (FIG. 8, 830-2) on the shared persistent FAM (FIG. 2, 202) or that have been copied to the local cache memory device (FIG. 2, 212).

If the most recent epoch identifier (FIG. 8, 828) in which the shared memory copy of the key (FIG. 2, 206-1) and the value (FIG. 2, 208-1) is found is greater than the valid epoch identifier (FIG. 8, 828-3) for the cache entry (FIG. 2, 214) as found in the local cache memory device (block 904, determination YES), it may be concluded that the cache copy of the value (FIG. 2, 208-2) is stale. In this case, the shared memory copy of the value (FIG. 2, 208-1) is retrieved (block 905) from the shared persistent FAM (FIG. 2, 202) using the entry pointer (FIG. 3, 324). In some examples, the most recent epoch identifier is compared against the valid epoch identifier at the same time as the value is retrieved from the shared persistent FAM (FIG. 2, 202). In this case, time is saved as the entry pointer (FIG. 3, 324) is still valid and may be used to directly retrieve the shared memory copy of the value (FIG. 2, 208-1) rather than traversing the key-value store index in the shared persistent FAM (FIG. 2, 202). In this example, the cache entry (FIG. 2, 214) is updated (block 906). That is, the cache copy of the key (FIG. 2, 206-2) and value (FIG. 2, 208-2) are overwritten with the shared memory copy of the key (FIG. 2, 206-1) and value (FIG. 2, 208-1). Also, the valid epoch ID (FIG. 8, 828-3) is updated. Accordingly, the updated value now stored in cache is returned (block 907).

By comparison, if the most recent epoch identifier (FIG. 8, 828) in which the shared memory copy of the value (FIG. 2, 208-1) is found is less than or equal to the valid epoch identifier (FIG. 8, 828-3) for the cache entry (FIG. 2, 214) (block 904, determination NO), it may be concluded that the cache copy of the value (FIG. 2, 208-2) is current. In this case, the cache copy of the value (FIG. 2, 208-2) may be returned (block 907).

In the case that a cache miss is detected, (block 902, determination NO, the key-value store index in the shared persistent FAM (FIG. 2, 202) is searched (block 908) to find the shared memory copy of the key (FIG. 2, 206-1). If the shared memory copy of the key (FIG. 2, 206-1) is not found (block 909, determination NO), a result of "key not found" or other indication is returned (block 910).

If the shared memory copy of the key (FIG. 2, 206-1) is found (block 909, determination YES), the shared memory copy of the key (FIG. 2, 206-1) and value (FIG. 2, 208-1), and most recent epoch identifier (FIG. 8, 828), which will be stored as the valid epoch identifier (FIG. 8, 828-3) from the shared persistent FAM (FIG. 2, 202) are retrieved (block 911). In some cases if the shared memory copy of the key (FIG. 2, 206-1) is found in the open epoch signature (FIG. 8, 830-1), it has been updated in this epoch and the cache copy of the key (FIG. 2, 206-2) and value (FIG. 2, 208-2) are tagged with the current epoch identifier (FIG. 8, 828-1). If the shared memory copy of the key (FIG. 2, 206-1) is not found in the open epoch signature (FIG. 8, 830-1), the valid epoch ID (FIG. 8, 828-3) for the cache entry (FIG. 2, 214) in the local cache memory device (FIG. 2, 212) is set to the current epoch less one.

If there is sufficient space in the local cache memory device (FIG. 2, 212) to store the retrieved data (block 912, determination YES), the information is stored (block 914) in the cache entry (FIG. 2, 214) and the cache copy of the value (FIG. 2, 208-2) is returned (block 907). However, if there is not sufficient space in the local cache memory device (FIG. 2, 212) to store the retrieved data (block 912, determination NO), a cache entry (FIG. 2, 214) is evicted (block 913). At this point, the information is stored (block 914) in the cache entry (FIG. 2, 214) and the now updated cache copy of the value (FIG. 2, 208-2) is returned (block 907).

Figure 10:
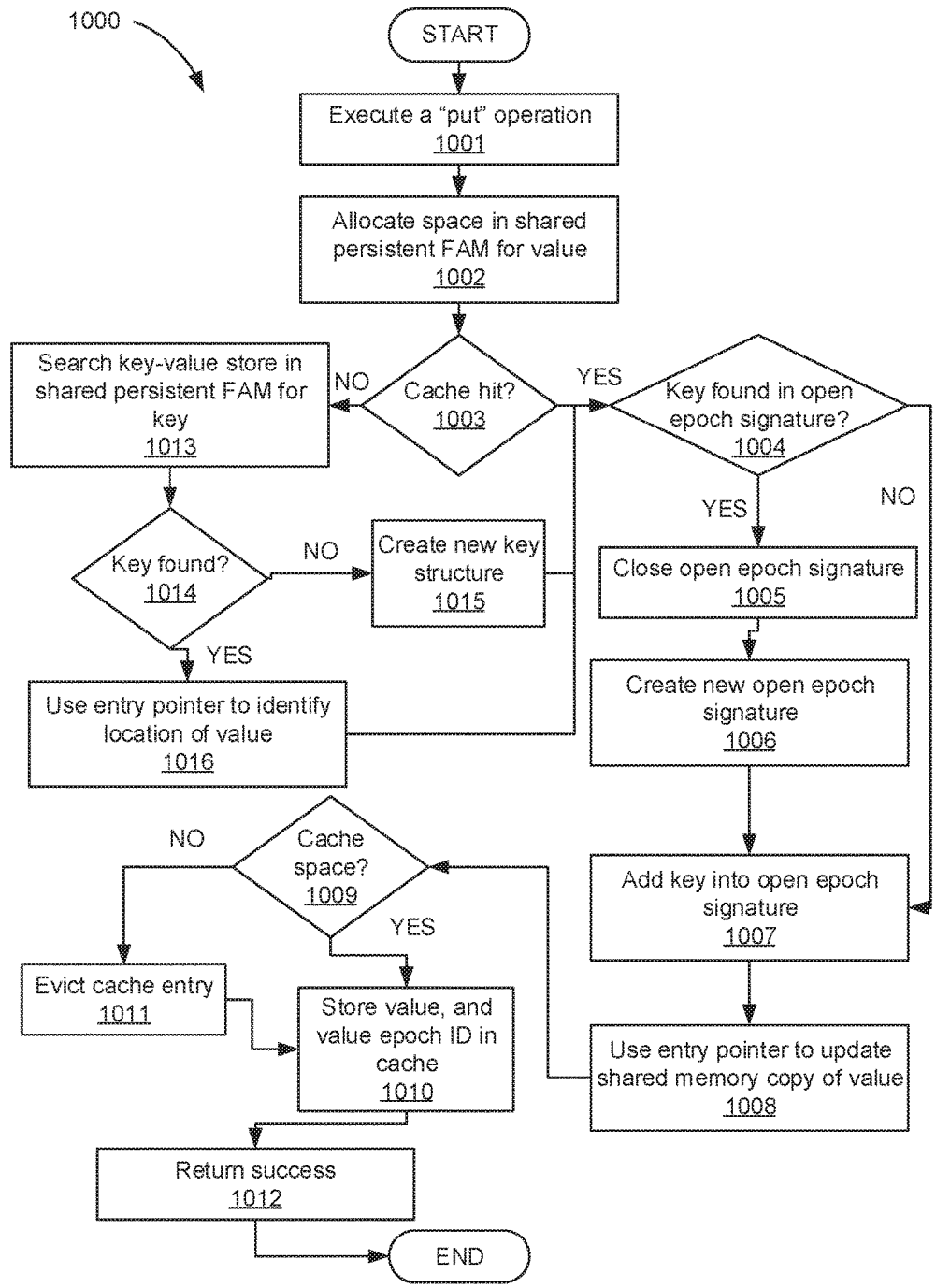
FIG. 10 is a flowchart of a method for performing a write operation and determining cache currency using persistent markers and epoch signatures, according to an example of the principles described herein.

FIG. 10 is a flowchart of a method (1000) for performing a "put" (write) operation and determining cache currency using persistent markers and epoch signatures (FIG. 8, 830), according to an example of the principles described herein. That is, in this method (1000), the marker (FIG. 2, 210) is a series of epoch identifiers (FIG. 8, 828) and corresponding epoch signatures that describe which keys (FIG. 2, 206-1) in the shared persistent FAM (FIG. 2, 202) were updated during a series of epochs, the marker location (FIG. 2, 216) is a memory address where the epoch identifiers (FIG. 8, 828) and epoch signatures (FIG. 8, 830) are stored, and the marker flag (FIG. 2, 218) is a valid epoch identifier (FIG. 8, 828-3) that identifies the last epoch in which the cache entry (FIG. 2, 214) is guaranteed to be up-to-date.

In this example, a "put" operation is executed (block 1001), which operates to place a value that is identified by an associated key in the shared persistent FAM (FIG. 2, 202). Space in the shared persistent FAM (FIG. 2, 202) is allocated for the value to be stored, and the requested value is written to the newly allocated space (block 1002). It is determined (block 1003) whether there is a "hit" in the local cache memory device (FIG. 2, 212). A hit in the local cache memory device (FIG. 2, 212) indicates that the local cache memory device (FIG. 2, 212) includes a copy of the key (FIG. 2, 206-2) and the value (FIG. 2, 208-2). If there is a cache hit (block 1003, determination YES), the entry pointer (FIG. 3, 324) as found in the cache entry (FIG. 2, 214) can be used to update the value (FIG. 2, 208-1) in the shared persistent FAM. However, before the value can be updated, the key is added to the appropriate epoch signature (FIG. 8, 830).

Accordingly, if there is a cache hit (block 1003, determination YES), it is determined (block 1004) if the shared memory copy of the key (FIG. 2, 206-1) is found in the open epoch signature (FIG. 8, 830-1). If so, (block 1004, determination YES), the open epoch signature (FIG. 8, 830-1) is closed (block 1005) and a new open epoch signature (FIG. 8, 830-1) is created (block 1006). This is because each key can be updated just once per epoch. The shared memory copy of the key (FIG. 2, 206-1) is then added (block 1007) to the newly created open epoch signature (FIG. 8, 830-1). If the shared memory copy of the key (FIG. 2, 206-1) is not found in the open epoch signature (FIG. 8, 830-1) (block 1004, determination NO), the shared memory copy of the key (FIG. 2, 206-1) is added (block 1007) to the open epoch signature (FIG. 8, 830-1). The valid epoch ID (FIG. 8, 828-3) for this update will be the open epoch ID (FIG. 8, 828-1). Once the key is included in the appropriate epoch signature, the entry pointer (FIG. 3, 324) is used to update (block 1008) the value (FIG. 2, 208-1) in the shared persistent FAM (block 1008). This facilitates persistently updating the value, and making the new value visible to other computing devices.

To service subsequent requests on this computing device more efficiently, the new key-value data is also stored in the local cache memory device (FIG. 2, 212). Accordingly, if there is sufficient space in the local cache memory device (FIG. 2, 212) to store the newly updated data (block 1009, determination YES), the new value and the corresponding valid epoch ID are stored (block 1010) in the cache entry (FIG. 2, 214) and an indication returned (block 1012) that the write operation was successful. However, if there is not sufficient space in the local cache memory device (FIG. 2, 212) to store the loaded data (block 1009, determination NO), a cache entry (FIG. 2, 214) is evicted (block 1011). At this point, the updated information is stored (block 1010) in the cache entry (FIG. 2, 214) and an indication returned (block 1012) that the put operation was successful.

In the case that a cache miss is detected, (block 1003, determination NO), the key-value store index in the shared persistent FAM (FIG. 2, 202) is searched (block 1013) to find the shared memory copy of the key (FIG. 2, 206-1). If the shared memory copy of the key (FIG. 2, 206-1) is not found (block 1014, determination NO), a key structure is created (block 1015). More specifically, space is allocated in the shared persistent FAM (FIG. 2, 202) for the key structure, and the key (FIG. 2, 206-1) and pointer to the newly allocated/stored value (block 1002) are stored in the new key structure. Following the creating of a new key structure (block 1015), it is then determined (block 1004) if the shared memory copy of the key (FIG. 2, 206-1) is found in the open epoch signature (FIG. 8, 830-1). If the shared memory copy of the key (FIG. 2, 206-1) is found (block 1014, determination YES), the entry pointer as found in shared persistent FAM (FIG. 2, 202) can be used to update the value (FIG. 2, 208-1). As described earlier, the key is first added to the appropriate open epoch signature. Once the key is included in the appropriate epoch signature, the entry pointer (FIG. 3, 324) is used to update the value (FIG. 2, 208-1) in the shared persistent FAM (block 1016).

Figure 11:
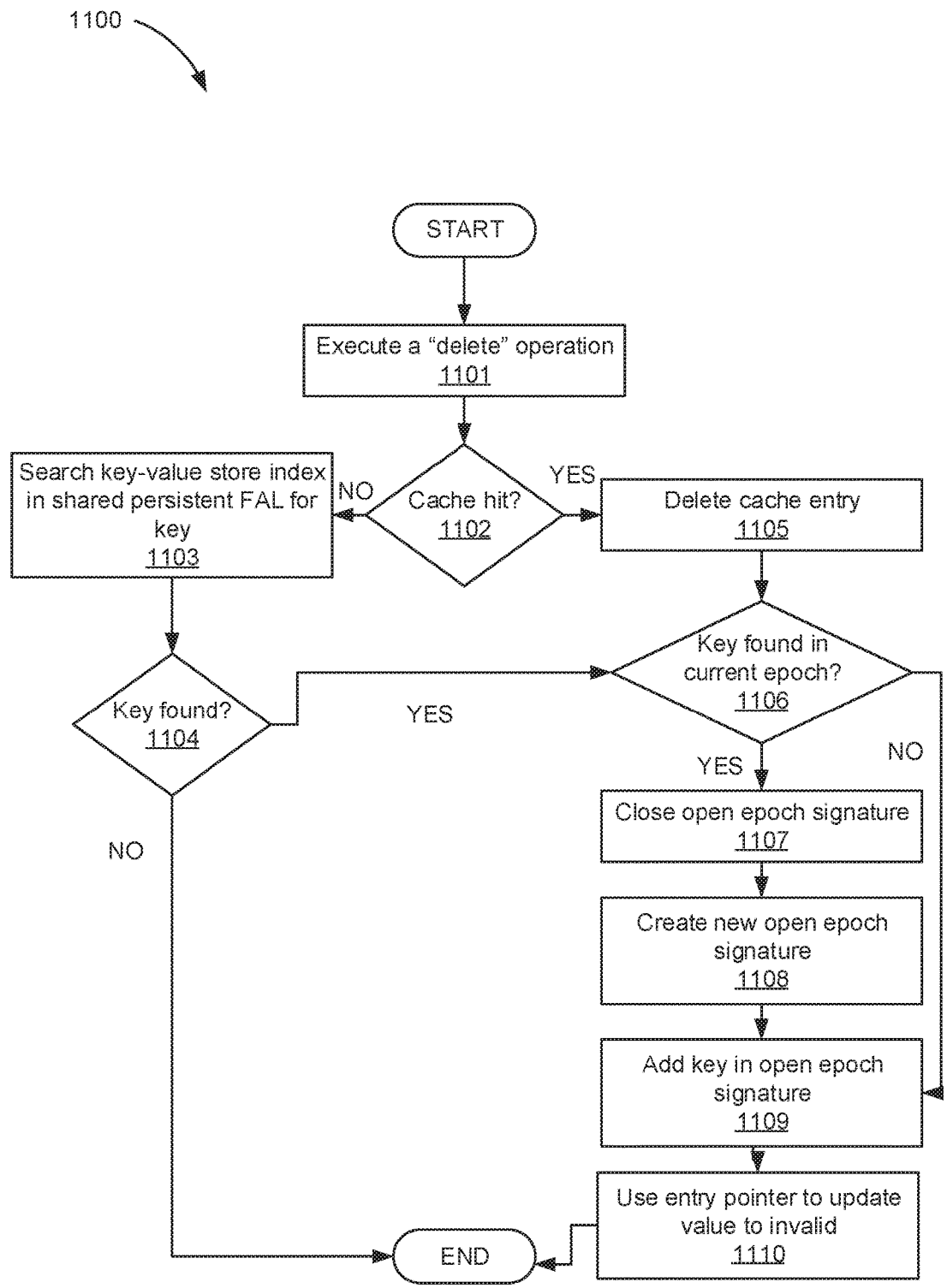
FIG. 11 is a flowchart of a method for performing a delete operation and determining cache currency using persistent markers and epoch signatures, according to an example of the principles described herein.

FIG. 11 is a flowchart of a method (1100) for performing a delete operation and determining cache currency using persistent markers and epoch signatures (FIG. 8, 830), according to an example of the principles described herein. That is, in this method (1100), the marker (FIG. 2, 210) is a series of epoch identifiers (FIG. 8, 828) and corresponding epoch signatures (FIG. 8, 830) that describe which keys (FIG. 2, 206-1) in the shared persistent FAM (FIG. 2, 202) were updated during a series of epochs, the marker location (FIG. 2, 216) is a memory address where the epoch identifiers (FIG. 8, 828) and epoch signatures (FIG. 8, 830) are stored, and the marker flag (FIG. 2, 218) is a valid epoch identifier (FIG. 8, 828-3) that identifies the last epoch in which the cache entry (FIG. 2, 214) is guaranteed to be up-to-date.

In this example, a "delete" operation is executed (block 1101), which operates to remove a key and its associated value from the key-value store. It is determined (block 1102) whether there is a "hit" in the local cache memory device (FIG. 2, 212). A hit in the local cache memory device (FIG. 2, 212) indicates that the local cache memory device (FIG. 2, 212) includes a copy of the key (FIG. 2, 206-2) and the value (FIG. 2, 208-2). If there is a cache hit (block 1102, determination YES), the cache entry (FIG. 2, 214) is deleted (block 1105) from the local cache memory device (FIG. 2, 212). T). The entry pointer (FIG. 3, 324) as found in the cache entry (FIG. 2, 214) can be used to update the shared memory copy of the value (FIG. 2, 208-1) to invalid. As in the "put" operation, before the key can be removed from the key-value store, the key is added to the appropriate epoch signature (FIG. 8, 830). Accordingly, it is determined (block 1106) if the shared memory copy of the key (FIG. 2, 206-1) is found in the open epoch signature (FIG. 8, 830-1). If so, (block 1106, determination YES), the open epoch signature (FIG. 8, 830-1) is closed (block 1107) and a new open epoch signature (FIG. 8, 830-1) is created (block 1108). This is because each key can be updated just once per epoch. The shared memory copy of the key (FIG. 2, 206-1) is then added (block 1109) to the newly created open epoch signature. If the shared memory copy of the key (FIG. 2, 206-1) is not found in the open epoch signature (block 1106, determination NO), the shared memory copy of the key (FIG. 2, 206-1) is added (block 1109) to the open epoch signature (FIG. 8, 830-1). Once the key is included in the appropriate epoch signature, the entry pointer (FIG. 3, 324) is used (block 1110) to update the shared memory copy of the value (FIG. 2, 208-1) to invalid.

In the case of a cache miss, (block 1102, determination NO), the key-value store index in the shared persistent FAM (FIG. 2, 202) is searched (block 1103) to find the shared memory copy of the key (FIG. 2, 206-1). If the shared memory copy of the key (FIG. 2, 206-1) is not found (block 1104, determination NO), an indication is returned. If the shared memory copy of the key (FIG. 2, 206-1) is found (block 1104, determination YES), it is determined (block 1106) if the shared memory copy of the key (FIG. 2, 206-1)

is found in the open epoch signature (FIG. 8, 830-1). Once the key is included in the appropriate epoch signature, the entry pointer (FIG. 3, 324) is used (block 1110) to update the shared memory copy of the value (FIG. 2, 208-1) in the shared persistent FAM (FIG. 2, 202).

Figure 12:
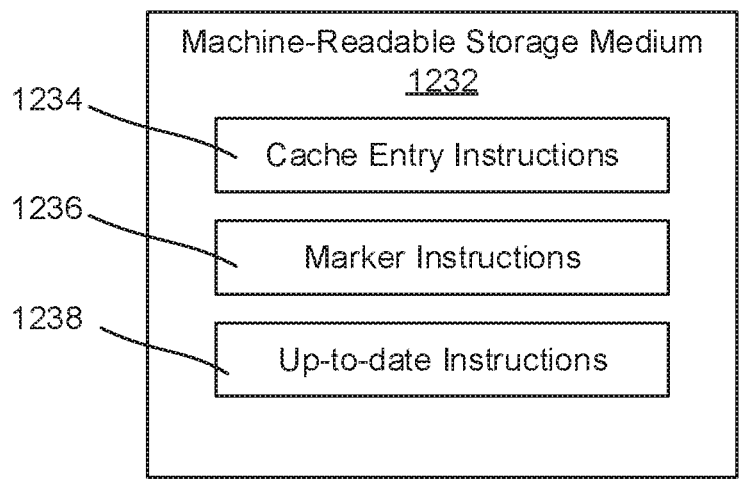
FIG. 12 is a diagram of a non-transitory machine-readable storage medium for determining cache currency using persistent markers, according to an example of the principles described herein.

FIG. 12 is a diagram of a non-transitory machine-readable storage medium (1232) for determining cache currency using persistent markers (FIG. 2, 212), according to an example of the principles described herein. To achieve its desired functionality, a computing system includes various hardware components. Specifically, the computing system includes a processor. Machine-readable storage medium (1232) is communicatively coupled to the processor. The machine-readable storage medium (1232) includes a number of instruction sets (1234, 1236, 1238) for performing a designated function. The machine-readable storage medium (1232) causes the processor to execute the designated function of the instruction sets (1234, 1236, 1238).

Although the following descriptions refer to a single machine-readable storage medium (1232), the descriptions may also apply to multiple machine-readable storage mediums. In such examples, the instruction sets (1234, 1236, 1238) may be distributed (e.g., stored) across multiple machine-readable storage mediums.

The processor refers to at least one processor and other resources used to process programmed instructions. For example, the processor may be a number of central processing units (CPUs), microprocessors, and/or other hardware devices suitable for retrieval and execution of instructions stored in machine-readable storage medium (1232). The processor may fetch, decode, and execute instructions (1234, 1236, 1238) for determining cache currency using persistent markers (FIG. 2, 210). In one example, the processor may include a number of electronic circuits comprising a number of electronic components for performing the functionality of a number of the instructions in the machine-readable storage medium (1232). With respect to the executable instructions, representations (e.g., boxes) described and shown herein, it should be understood that part or all of the executable instructions and/or electronic circuits included within one box may, in alternate examples, be included in a different box shown in the figures or in a different box not shown.

The machine-readable storage medium (1232) represents generally any memory capable of storing data such as programmed instructions or data structures used by the computing system. The machine-readable storage medium (1232) includes machine-readable program code to cause tasks to be executed by the processor. The machine-readable storage medium (1232) may be tangible and/or non-transitory storage medium. The machine-readable storage medium (1232) may be any appropriate storage medium that is not a transmission storage medium. For example, the machine-readable storage medium (1232) may be any electronic, magnetic, optical, or other physical storage device that stores executable instructions. Thus, machine-readable storage medium (1232) may be, for example, Random Access Memory (RAM), a storage drive, an optical disc, and the like. The machine-readable storage medium (1232) may be disposed within the computing system. In this situation, the executable instructions may be "installed" on the computing system. In one example, the machine-readable storage medium (1232) may be a portable, external or remote storage medium, for example, that allows the computing system to download the instructions from the portable/external/remote storage medium. In this situation, the executable instructions may be part of an "installation package". As described herein, the machine-readable storage medium (1232) may be encoded with executable instructions for determining cache currency using persistent markers (FIG. 2, 212).

Referring to FIG. 12, cache entry instructions (1232), when executed by a processor, may cause the computing system to retrieve, from a local cache memory device (FIG. 2,2 12) paired with a computing device (FIG. 2, 220), a cache entry (FIG. 2, 213). Marker instructions (1236), when executed by a processor, may cause the computing system to, using a marker location (FIG. 2, 218) in the cache entry (FIG. 2, 214), retrieve a marker (FIG. 2, 210) from the shared persistent FAM (FIG. 2, 202). Up-to-date instructions (1238), when executed by a processor, may cause the computing system to determine, from the marker (FIG. 2, 210) and marker flag (FIG. 2, 216), whether the cache copy of the value (FIG. 2, 208-2) is current.

In some examples, the processor and machine-readable storage medium (1232) are located within the same physical component, such as a server, or a network component. The machine-readable storage medium (1232) may be part of the physical component's main memory, caches, registers, non-volatile memory, or elsewhere in the physical component's memory hierarchy. In one example, the machine-readable storage medium (1232) may be in communication with the processor over a network. Thus, the computing system may be implemented on a user device, on a server, on a collection of servers, or combinations thereof.

In summary, using such a system and method for determining cache currency of data values 1) provides efficient memory usage via a shared persistent FAM, or fabric-attached memory; 2) exhibits fast memory access by allowing computing devices to benefit from local cached data while still serving up-to-date data resulting from updates of other computing devices; 3) improves access times for cache hits on up-to-date data as the data is retrieved from cache as opposed to a slower shared persistent FAM; 4) improves access times for cache hits on stale data as the data is retrieved using a pointer, rather than traversing the shared persistent FAM key-value index; and 5) provides this increased memory performance without specialized hardware. However, it is contemplated that the devices disclosed herein may address other matters and deficiencies in a number of technical areas.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method, comprising:
retrieving, from a local cache memory device paired with a computing device, a cache entry containing:
a key;
a value; and
a marker flag to determine whether the cache entry is current;
retrieving, using a marker location from the local cache memory device, which indicates a location of a marker in a shared persistent fabric-attached memory (FAM), the marker from the shared persistent FAM;
determining, from the marker and the marker flag, whether the cache entry is current;
wherein the shared persistent FAM is connected to the local cache memory devices of multiple computing devices, wherein:
the marker comprises a series of epoch identifiers sequentially numbered and corresponding epoch signatures, wherein each epoch identifier corresponds to an epoch signature that identifies keys updated during a corresponding epoch, and the epoch signatures comprise an open epoch signature that is active, and a number of closed epoch signatures that are inactive and not-writeable;
the marker flag comprises a valid epoch identifier indicating the epoch during which the key and the value in the local memory cache device are guaranteed to be up-to-date;
the marker location points to a location in the shared persistent FAM where a series of epoch signatures and epoch identifiers are stored; and
wherein determining whether the cache entry is current comprises:
identifying a most recent epoch identifier from the series of epoch identifiers corresponding to a most recent epoch signature where the key is indicated; and
comparing the valid epoch identifier in the marker flag with the most recent epoch identifier; and
copying closed epoch signatures to the local cache memory device.

2. The method of claim 1, further comprising:
when the most recent epoch identifier has a number less than or equal to the valid epoch identifier in the marker flag, returning at least one of the value from the local cache memory device and a status; and
when the most recent epoch identifier has a number greater than the valid epoch identifier in the marker flag:
overwriting the key and associated value in the cache entry with a key and associated value from the shared persistent FAM; and
overwriting the valid epoch identifier in the cache entry with the most recent epoch identifier.

3. The method of claim 1, further comprising closing the open epoch signature and initializing a new open epoch signature when a second update to an associated key from the shared persistent FAM is made.

4. The method of claim 1, wherein:
closed epoch signatures are searched at the same time as searching the open epoch signature; and
comparing the valid epoch identifier in the marker flag with the most recent epoch identifier occurs at the same time the value is retrieved from the shared persistent FAM.

5. A system, comprising:
a shared persistent fabric-attached memory (FAM) shared by and connected to multiple computing devices, the shared persistent FAM comprising:
a number of entries, each entry comprising a key and a value paired with the key; and
a marker for each key-value pair indicating that each key and value are up-to-date; and
a local cache memory device paired with a computing device, the local cache memory device comprising cache entries and a marker location, wherein each cache entry comprises:
the key;
a value paired with the key; and
a marker flag to determine whether the key and value in the cache entry are current,
wherein:
the marker comprises a series of epoch identifiers sequentially numbered and corresponding epoch signatures, wherein each epoch identifier corresponds to an epoch signature that identifies keys updated during a corresponding epoch, and the epoch signatures comprise an open epoch signature that is active and a number of closed epoch signatures that are inactive and non-writeable, the closed epoch signatures being copied to the local cache memory device;
the marker flag comprises a valid epoch identifier indicating an epoch during which the key and the value in the local memory cache device are guaranteed to be up-to-date;
the marker location points to a location in the shared persistent FAM where a series of epoch signatures and epoch identifiers are stored; and
the cache entry is determined to be current by:
identifying a most recent epoch identifier from the series of epoch identifiers corresponding to a most recent epoch signature where the key is indicated; and
comparing the valid epoch identifier in the marker flag with the most recent epoch identifier.

6. The system of claim 5, wherein:
the keys and values in the shared persistent FAM are stored in an index structure; and
the marker location refers to a fixed location in the shared persistent FAM.

7. A non-transitory machine-readable storage medium encoded with instructions executable by a processor, the machine-readable storage medium comprising instructions to:
retrieve, from a local cache memory device paired with a computing device, a marker location indicating a location of a marker in a shared persistent fabric-attached memory (FAM) and a cache entry containing:
a key;
a value to be used by the computing device; and
a marker flag to determine whether the key and value in the cache entry are current;
retrieve the marker from the shared persistent FAM using the marker location; and
determine, from the marker and the marker flag, whether a cache copy of the value is current,
wherein the shared persistent FAM is connected to the local cache memory devices of multiple computing devices,
wherein:
the marker comprises a series of epoch identifiers sequentially numbered and corresponding epoch signatures, wherein each epoch identifier corresponds to an epoch signature that identifies keys updated during a corresponding epoch, and the epoch signatures comprise an open epoch signature that is active, and a number of closed epoch signatures that are inactive and not-writeable;
the marker flag comprises a valid epoch identifier indicating the epoch during which the key and the value in the local memory cache device are guaranteed to be up-to-date;
the marker location points to a location in the shared persistent FAM where a series of epoch signatures and epoch identifiers are stored; and
wherein determining whether the cache entry is current comprises:

identifying a most recent epoch identifier from the series of epoch identifiers corresponding to a most recent epoch signature where the key is indicated; and comparing the valid epoch identifier in the marker flag with the most recent epoch identifier; and copying closed epoch signatures to the local cache memory device.

* * * * *